US 8,510,015 B2

(12) United States Patent
Beausoleil et al.

(10) Patent No.: US 8,510,015 B2
(45) Date of Patent: Aug. 13, 2013

(54) RECIPROCATING COMPRESSOR SIMULATOR AND A COMPUTER SYSTEM USING THE SAME

(75) Inventors: Peter Andrew Beausoleil, Calgary (CA); Robert Frank Parchewsky, The Hague (NL)

(73) Assignee: Shell Oil Company, Houston, TX (US)

( * ) Notice: Subject to any disclaimer, the term of this patent is extended or adjusted under 35 U.S.C. 154(b) by 762 days.

(21) Appl. No.: 12/664,095

(22) PCT Filed: Jun. 16, 2008

(86) PCT No.: PCT/US2008/067122
§ 371 (c)(1),
(2), (4) Date: May 4, 2010

(87) PCT Pub. No.: WO2008/157496
PCT Pub. Date: Dec. 24, 2008

(65) Prior Publication Data
US 2010/0286829 A1    Nov. 11, 2010

Related U.S. Application Data

(60) Provisional application No. 60/944,286, filed on Jun. 15, 2007.

(51) Int. Cl.
*G06F 19/00* (2011.01)
*G01M 15/00* (2006.01)
*G01L 7/16* (2006.01)

(52) U.S. Cl.
USPC ............. 701/101; 702/182; 702/183; 73/744; 417/437

(58) Field of Classification Search
USPC .................... 701/101, 102, 115; 702/45, 50, 702/182, 183, 187; 417/437, 439; 73/744
See application file for complete search history.

(56) References Cited

U.S. PATENT DOCUMENTS

| | | | |
|---|---|---|---|
| 4,559,610 A | 12/1985 | Sparks et al. | 364/803 |
| 4,561,402 A | 12/1985 | Nakano et al. | 123/489 |
| 4,817,390 A * | 4/1989 | Suganami et al. | 417/439 |
| 5,437,254 A | 8/1995 | Korenaga et al. | 123/416 |
| 5,461,311 A | 10/1995 | Nakazato et al. | 324/207.24 |
| 6,292,757 B1 | 9/2001 | Flanagan et al. | 702/138 |
| 6,453,265 B1 | 9/2002 | Dekhil et al. | 702/181 |
| 6,646,564 B1 | 11/2003 | Azieres et al. | 340/679 |
| 6,748,341 B2 | 6/2004 | Crowder, Jr. | 702/181 |
| 7,044,373 B1 | 5/2006 | Garber et al. | 235/385 |
| 7,123,151 B2 | 10/2006 | Garber et al. | 340/572.4 |
| 7,581,449 B2 * | 9/2009 | Miller | 73/744 |
| 2001/0053940 A1 | 12/2001 | Horn et al. | 700/32 |
| 2004/0153437 A1 | 8/2004 | Buchan | 707/1 |
| 2005/0007249 A1 | 1/2005 | Eryurek et al. | 340/511 |
| 2005/0007826 A1 | 1/2005 | Boggs et al. | 365/189.01 |
| 2005/0049832 A1 | 3/2005 | Gorinevsky | 702/182 |
| 2005/0159922 A1 | 7/2005 | Hsiung et al. | 702/182 |
| 2005/0205037 A1 | 9/2005 | Lewis et al. | 123/179.16 |
| 2008/0016353 A1 | 1/2008 | Carro | 713/171 |
| 2008/0129507 A1 | 6/2008 | Doan et al. | 340/572.1 |

FOREIGN PATENT DOCUMENTS

WO    WO2005108744    11/2005

* cited by examiner

*Primary Examiner* — Willis R Wolfe, Jr.

(57) ABSTRACT

A method comprising operating a compressor; obtaining operating parameters of the compressor; starting a counter for a crankshaft angle from 0 to 360 degrees; calculating piston displacement and a volume of gas in a cylinder of the compressor as a function of the angle; and calculating a pressure within the cylinder.

11 Claims, 13 Drawing Sheets

| Configuration | Pressure at head end | Pressure at crank end |
|---|---|---|
| SAHE | $P_{DA,HE}$ | $P_{SA}$ |
| SACE | $P_{SA}$ | $P_{DA,CE}$ |
| DA | $P_{DA,HE}$ | $P_{DA,CE}$ |
| NA | $P_{SA}$ | $P_{SA}$ |

FIGURE 7

RECIPROCATING COMPRESSOR SIMULATOR AND A COMPUTER SYSTEM USING THE SAME

CROSS-REFERENCE TO RELATED APPLICATIONS

This application claims priority, pursuant to 35 U.S.C. §119(e), of U.S. Provisional Application Ser. No. 60/944,286 entitled "REMOTE MONITORING SYSTEMS AND METHODS," filed on Jun. 15, 2007 in the name of James Kong and is hereby incorporated by reference.

BACKGROUND

U.S. Patent Application Publication 2008/0129507 discloses a method for employing radio frequency (RF) identifier (ID) transponder tags (RFID tags) to create a unique identifier, termed an RFID signature, for use within a data processing system with respect to a person or an object. An interrogation signal is transmitted toward a person or an object with which a set of one or more RFID tags are physically associated. A first set of RFID tag identifiers are obtained from an interrogation response signal or signals returned from the set of one or more RFID tags. A mathematical operation is performed on the first set of RFID tag identifiers to generate an RFID signature value, which is employed as an identifier for the person or the object within the data processing system with respect to a transaction that is performed by the data processing system on behalf of the person or the object. U.S. Patent Application Publication 2008/0129507 is herein incorporated by reference in its entirety.

U.S. Patent Application Publication 2008/0016353 discloses a method and system for verifying the authenticity and integrity of files transmitted through a computer network. Authentication information is encoded in the filename of the file. In a preferred embodiment, authentication information is provided by computing a hash value of the file, computing a digital signature of the hash value using a private key, and encoding the digital signature in the filename of the file at a predetermined position or using delimiters, to create a signed filename. Upon reception of a file, the encoded digital signature is extracted from the signed filename. Then, the encoded hash value of the file is recovered using a public key and extracted digital signature, and compared with the hash value computed on the file. If the decoded and computed hash values are identical, the received file is processed as authentic. U.S. Patent Application Publication 2008/0016353 is herein incorporated by reference in its entirety.

SUMMARY

In one embodiment, the invention provides a method comprising operating equipment comprising a piston within a cylinder; obtaining parameters of the equipment from a data repository; calculating a P-V cycle as a function of a crankshaft rotation angle; calculating a rod load using the P-V cycle values In another embodiment, the invention provides a method comprising operating a compressor; obtaining operating parameters of the compressor; starting a counter for a crankshaft angle from 0 to 360 degrees; calculating piston displacement and a volume of gas in a cylinder of the compressor as a function of the angle; and calculating a pressure within the cylinder.

Other aspects of the invention will be apparent from the following description and the appended claims.

BRIEF DESCRIPTION OF DRAWINGS

FIG. 7 shows a table of pressure variables associated with various cylinder configurations of a compression cycle in a reciprocating compressor in accordance with one or more embodiments of the invention.

DETAILED DESCRIPTION

Figure 1:
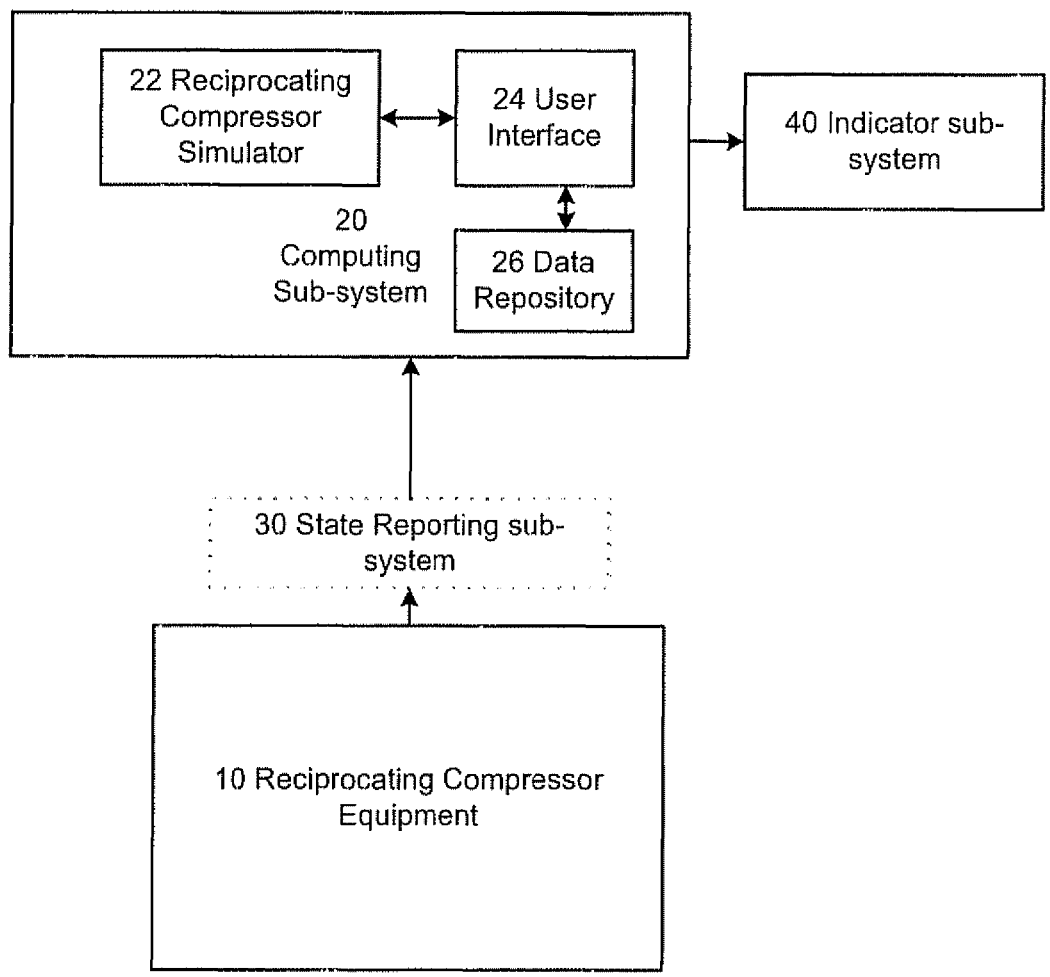
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and a method for monitoring the working condition of a reciprocating compressor, for example by monitoring parameters such as inertia, pressure, and total loads on a piston rod. In one or more embodiments of the invention, each piece of equipment has state reporters associated with the equipment. The state reporters may include parameter measuring equipment for measuring parameters not limited to rotational speed of crankshaft, bore diameter, cylinder clearance, one or more individuals viewing the equipment, and other such monitors of the equipment. The state reporters gather unprocessed data that describes the operating parameters of the equipment. The operational parameters may define parameters internal to the equipment.

The unprocessed data is analyzed at multiple levels of analyses to provide a complete view of the state of the equipment. Additionally, the unprocessed data may also be pre-stored in a data repository that serves as a reservoir of data used by the levels of analyses, and the state reporter may simply interact with the repository to trigger an appropriate choice of unprocessed data. The levels of analyses may include performance analysis, health analysis, performance analysis, and benchmark analysis. The levels of analyses create calculated data representing the status of the equipment, the health of the equipment, and the performance of the equipment.

The calculated data may be checked as to whether the data values fall within a predefined limit. The limit may be a manufacturer specified value, based on pre-conducted tests that determine acceptable maximum values for the equipment. The limits of data and other manufacturer specific information about the equipment may be pre-stored in a data repository. An indicator may indicate the exceeding of the predefined limit from the calculated data values and serve as an alarm indicating a concern about the status of the equipment.

FIG. 1:

FIG. 1 shows a schematic diagram of a system in accordance with one or more embodiments of the invention. As shown in FIG. 1, the system includes a reciprocating compressor equipment (10), a state reporting sub-system (30), a computing sub-system (20), and an indicator sub-system (40). The system is discussed below.

The reciprocating compressor equipment (10) corresponds to the physical devices that is being monitored. For example, the compressor equipment (10) may include crankshafts, piston rods, valves, as well as other such components.

In one or more embodiments of the invention, the equipment (10) is monitored by state reporting sub-system (30). Each state reporter includes functionality to obtain unprocessed data. The state reporter may be a device for conducting measurements, a person monitoring the equipment, or any other monitoring unit that obtains data about the operating parameters. The state reporter may obtain the equipment parameters such as density of gas, angular velocity, cylinder clearance, valve coefficient, piston or cylinder bore diameter, specific heat of gas, mass, mass flow rate, crank shaft rotational speed, as well as other such parameters necessary to perform an analysis of the performance, and health of equipment.

The computing sub-system (20) corresponds to a sub-system for receiving data from the state reporter and conducting analysis of received data that constitute operating parameters of the equipment. The computing sub-system consists of a data repository (26) that may have pre-stored data about standard operating parameters of the equipment, and the state reporter may interact with the data repository to trigger choice of appropriate data from the repository. The data repository may also include data specifying manufacturer-defined operating limits of the equipment, specifications of the equipment, and/or limits above which health and performance of the equipment may be a concern. In one or more embodiments of the invention, the data repository may be a text file containing data or a spreadsheet.

The data repository may have bi-directional data exchange with a user-interface (24). In one or more embodiments of the invention, the user-interface is a Graphic User Interface (GUI) that plots an end-result or is an application suite for a user to make choices of data stored in the data repository and/or an application suite that accepts data from the user for analysis. The user-interface also may have a bi-directional data exchange with the Reciprocating Compressor Simulator (22). The Reciprocating Compressor Simulator (RCS) may be an executable computer program performing calculations using an input from the interface based on programmed instructions, and may output data for the GUI to plot. The output data from the RCS may be an indicator of performance, and/or health of the equipments. In one or more embodiments of the invention, the RCS may output a rod load report including the inertia load, pressure load, and total load. In one or more embodiments of the invention, the RCS may output a text file or spreadsheet into a computer folder for future analysis.

A reciprocating mass of the compressor equipment is a sum of the masses of the piston, piston rod, piston nut, crosshead, crosshead pin, crosshead nut, and balance mass, which are components of the reciprocating compressor. A rod load report may determine health of the reciprocating compressor equipment. If any of a pressure load, inertia load, and/or total load exceeds pre-defined limits, an indicator sub-system (40) may be triggered. In one or more embodiments of the invention, the indicator sub-system may be a plurality of lightbulbs indicating the state of the equipment with light of different colors, each corresponding to a case when a pre-defined limit is exceeded. Alternately, the indicator sub-system may be an alarm buzzer, an action initiating immediate shut-down of the equipment, or an electronic communication (e.g., email, text message, etc.) to an individual responsible for monitoring the equipment. It is obvious to a person of ordinary skill in the art that appropriate processing of the computing output may be necessary to trigger the appropriate operation of the indicator sub-system.

In one or more embodiments of the invention, the RCS may include instructions for calculating the Pressure-Volume (P-V) cycle a function of crank shaft rotating angle, with valve losses being accounted for. In one or more embodiments of the invention, the RCS may calculate the total loads on the piston rods of a compressor given the weight of the reciprocating assembly and results of calculations of the P-V cycle. In one or more embodiments of the invention, the RCS may also calculate the number of degrees of rod reversal by checking the total load at each degree of crankshaft rotation.

Figure 2:
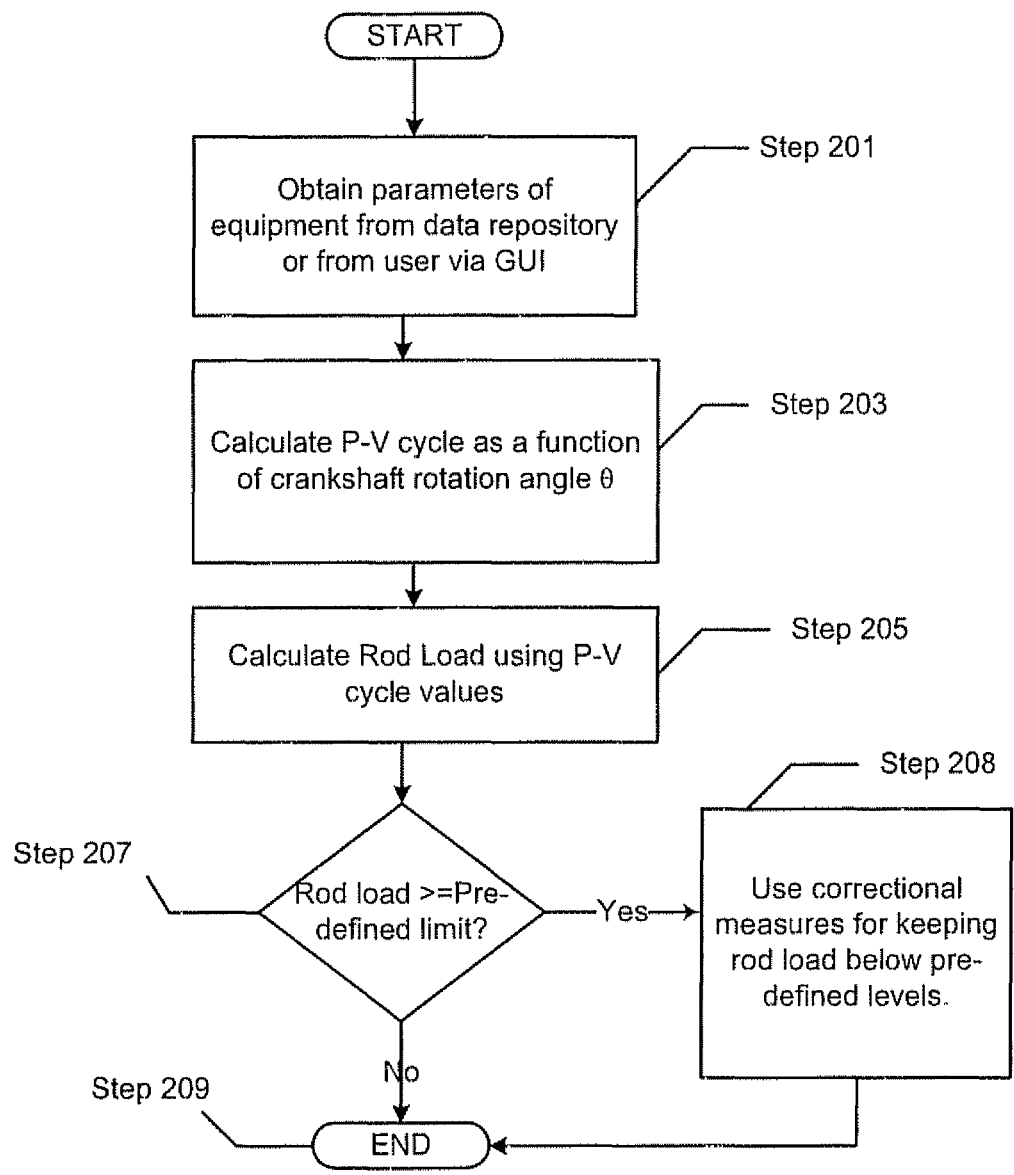
FIG. 2 shows a flowchart of a method in accordance with one or more embodiments of the invention.

FIG. 2:

FIG. 2 shows the steps involved in an exemplary calculation performed by the RCS during one rotation cycle of the crankshaft. In Step 201, the reciprocating compressor equipment parameters are obtained from the data repository or from a user through the GUI. In Step 203, the P-V cycle is calculated as a function of crankshaft angle, $\theta$, for a complete rotation cycle from 0 to 360 degrees (see e.g., FIGS. 8A, 8B, 9A, 9B below). Step 205 involves calculation of the rod loads using the calculated P-V values (discussed below). In Step 207, the rod load values are compared with pre-defined limits in the data repository. If the magnitude of the values are less than the pre-defined limits, then the calculation for one rotation cycle ends, and is repeated again for the next cycle. If the magnitude of the values are more than the pre-defined limits, then an alarm may be triggered as discussed above. Further, corrective measures may be taken to restore the equipment to a state of proper functionality by way of a part replacement or change in conditions, where the data repository may also be updated.

FIG. 3:

In one or more embodiments of the invention, a P-V cycle is calculated as a basis for the theoretical rod load calculations. A typical reciprocating compressor is shown in FIG. 3 to aid in physical correlation and visualization of variable data calculated by the RCS.

Figure 3:
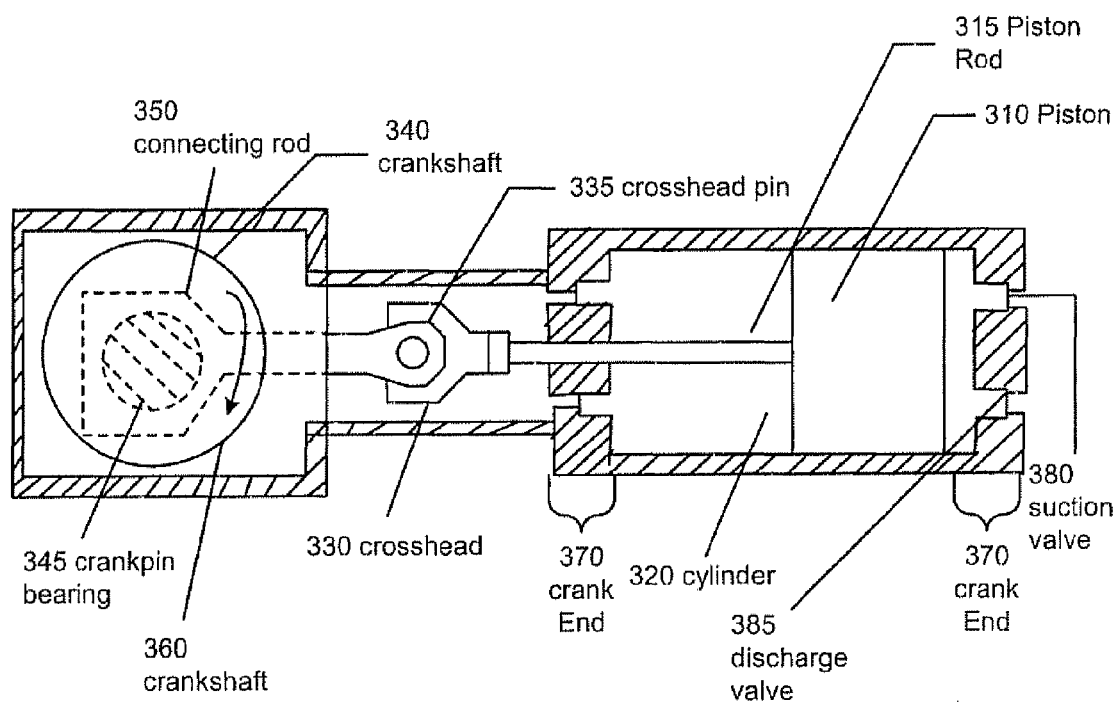
FIG. 3 shows a view of a reciprocating compressor in accordance with one or more embodiments of the invention.

A reciprocating compressor includes a cylinder 320, where compression may take place at the head end 375 of the cylinder, the crank end of the cylinder 370, or both, by way of translational movement of the piston 310 within the cylinder 320 (only compression corresponding to head end 375 is shown in FIG. 3). When compression occurs at both ends, the configuration is termed "double acting." Since the rotation of the crankshaft 360 contributes to the reciprocal translational movement of the piston 310 within the cylinder 320, the compressor is termed "reciprocal." The crosshead 330 serves as a transition from the piston rod 315 to the connecting rod 350 of the crankshaft 360. Both the head end 375 and the crank end of the cylinder 370 may each include two valves: a suction valve 380 and a discharge valve 385 (head end only labeled in FIG. 3).

Rotation of crankshaft 360 and the motion of the connecting rod 350 cause the crosshead pin 335 to moved back and forth within a bushing. This necessitates reversal of load between tension and compression in the piston rod 315 at the crosshead pin 335 and the bushing for adequate lubrication of a joint filled with oil. As the crosshead pin 335 moves from one side to the other, the oil is squeezed out from the point of contact to lubricate the rest of the two surfaces. If this reversal does not happen, oil is not applied to a load bearing side of the pin 335 and bushing, and the bearing will eventually fail. In one or more embodiments of the invention, the RCS may also calculate the number of degrees of rod reversal, i.e. load on rod changing from a positive value to negative value, and vice versa, by checking the total load at each degree of crankshaft rotation, which will be discussed later. There may also be pre-set positive and negative limits of operation.

Figure 4:
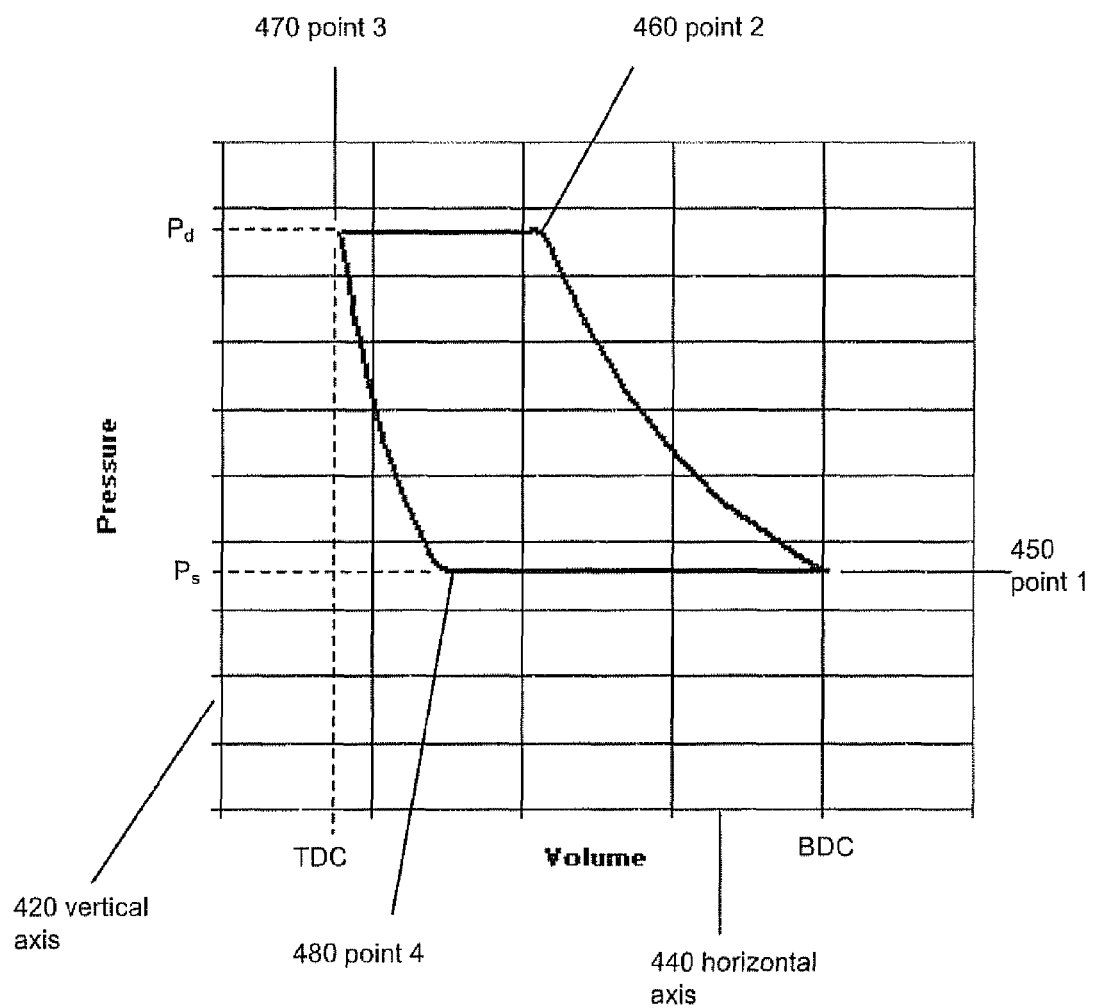
FIG. 4 shows a Pressure-Volume (P-V) diagram of a compression cycle of an ideal reciprocating compressor.

FIG. 4:

An ideal compression cycle of a reciprocating compressor is shown in FIG. 4 by way of a P-V diagram, i.e., pressure against cylinder volume. Using the head end compression cycle as an example, the cycle may be explained starting at point 1 (450). At point 1, the piston is at bottom dead center (BDC) and the cylinder volume is at its maximum. The gas in the cylinder is at suction pressure $P_s$ as shown in FIG. 4, and both suction and discharge valves are closed. As the crankshaft rotates and the piston advances towards the end of the cylinder, the gas trapped in the cylinder is compressed and the temperature and pressure of the gas rise. As this is an ideal case, there is no friction and no heat transfer, so the change is isentropic.

At point 2 (460), the gas has been compressed enough that the pressure in the cylinder equals the pressure in the discharge line, $P_d$. With an ideal compressor, the discharge valve will open at exactly this point and there will be no pressure loss across the valve. As the piston continues to the top dead center (TDC) position, the gas in the cylinder is pushed into the discharge line and the pressure in the cylinder remains constant.

When the piston reaches TDC, the cycle is at point 3 (470) on the diagram. The cylinder is now at its minimum volume and the discharge valve closes. It is to be noted that point 3 is not at 0% cylinder volume, there is some clearance volume between the piston and the cylinder such that the piston does not impact the end of the cylinder. As the crankshaft reverses the direction of piston travel, the gas trapped in this clearance volume expands, and the pressure and temperature decrease. Again, there are no losses or heat transfer and this is an isentropic process.

At point 4 (480), the pressure in the cylinder has been reduced down to suction pressure and the suction valve opens. As the cylinder volume increases with piston motion, gas is drawn into the cylinder through the suction valve. When the piston returns to BDC at point 1, the suction valve closes and the cycle is repeated.

In a real compressor, a small amount of differential pressure is required to unseat the suction and discharge valves by overcoming the static pressure and the valve spring. This means that the pressure in the cylinder must be higher than the discharge line pressure to open the discharge valve, and likewise lower than the suction line pressure to open the suction valve.

Compressor valves affect the performance of reciprocating compressors due to the pressure drop caused by gas flow through the valve area, the leakage through the valves in the reverse direction of desired flow, and the fact that real valves do not close exactly when ideal valves would. The performance parameters directly affected by real compressor valves are the efficiency, i.e., power and capacity, and the reliability of the compressor. In one or more embodiments of the invention the RCS takes into account the effect of real compressor valves on the ideal compression cycle. In one embodiment of the invention, the calculations are performed by determining a current point on the compression cycle as a function of the crankshaft angle. The crank angle is then increased by a set increment and the calculations are repeated at the new point, using the previous point as a reference.

Figure 5:
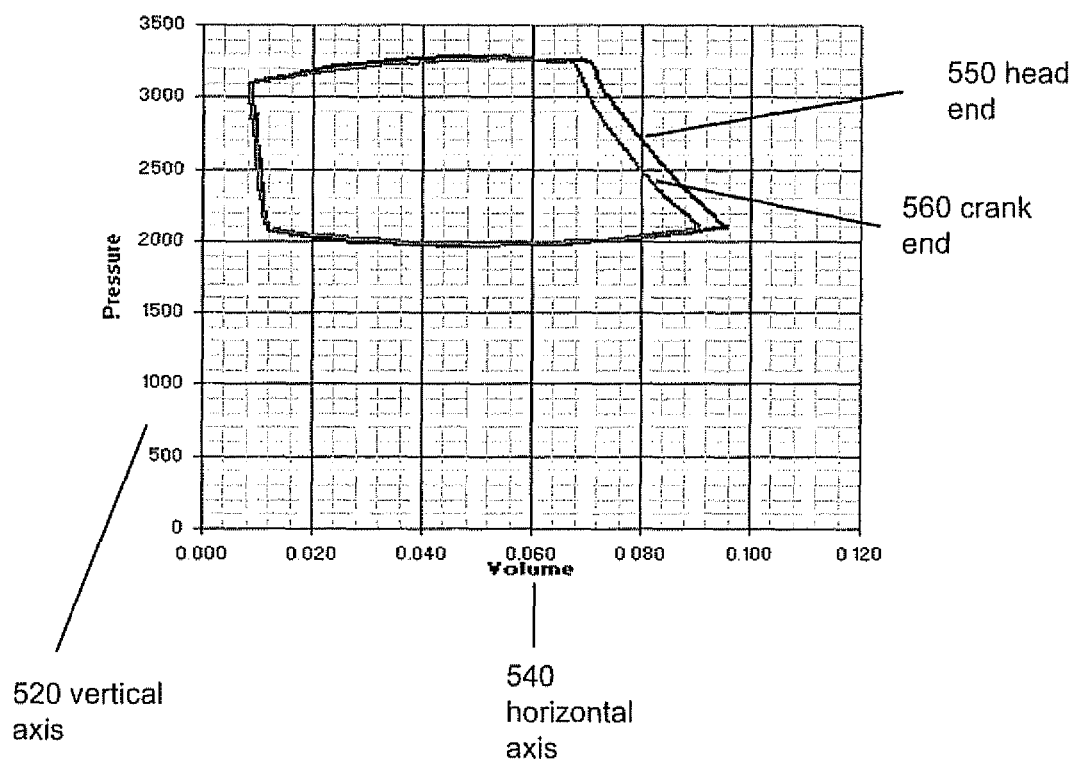
FIG. 5 shows an example of a P-V diagram of a compression cycle of a real reciprocating compressor in accordance with one or more embodiments of the invention.

FIG. 5:

Valve losses appear as pressure drops on the P-V diagram of each cylinder, and the resulting power loss may be determined due to the pressure drop across the suction and discharge valves in each cylinder. FIG. 5 shows a sample P-V diagram highlighting the difference between the ideal compression cycle and the actual cycle with valve losses plotted from data calculated by RCS in accordance with one or more embodiments of the invention.

In one or more embodiments of the invention, a HydroCOM may be acting on a suction valve. A HydroCOM is an unloading device that holds the suction valve open for part of the compression stroke in a cylinder. This method of a capacity control effectively reduces the volume of gas being discharged from the cylinder, as while the HydroCOM is acting on the suction valve, gas will flow back through this valve instead of being compressed in the cylinder. Once the HydroCOM releases the suction valve, the compression process will begin on the volume of gas remaining in the cylinder.

In one or more embodiments of the invention, if a compressor is equipped with a HydroCOM, its effects may be modeled in the RCS. The HydroCOM position is taken as a value between 0 and 1, where 1 indicates that HydroCOM is fully open and not acting on the suction valve, and 0 indicates that HydroCOM is acting continuously to hold the suction valve open throughout the entire compression stroke. When HydroCOM value is between 0 and 1, HydroCOM is acting on the suction valve throughout a specified fraction of the compression stroke.

Figure 6:
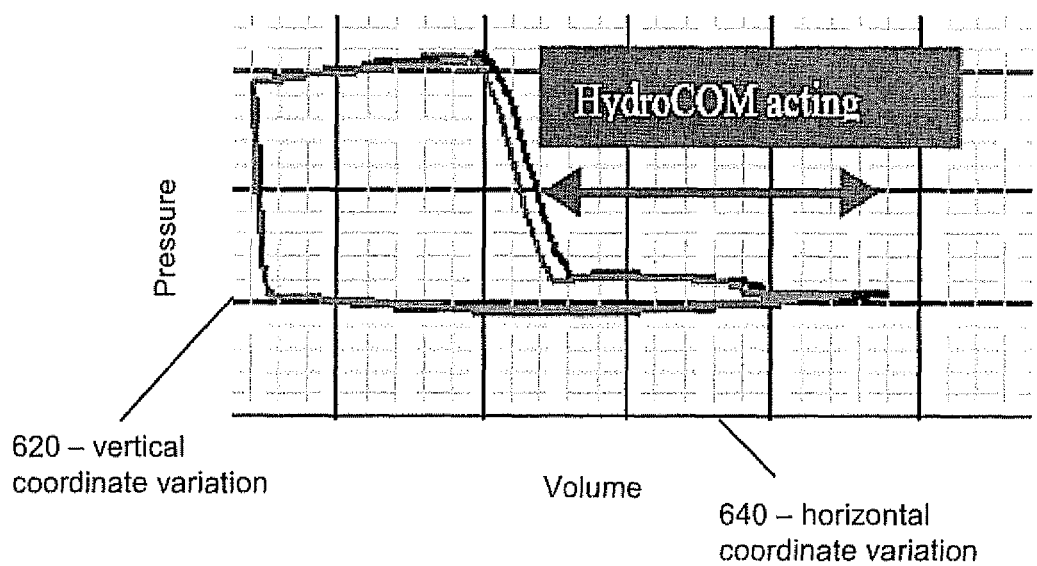
FIG. 6 shows an example of a P-V diagram of a compression cycle of a real reciprocating compressor, with the effects of the HydroCOM included, in accordance with one or more embodiments of the invention.

FIG. 6:

While the HydroCOM acts on the suction valve, gas from the cylinder flows back through the valve and experiences another pressure drop. This time the pressure is seen to increase in the P-V diagram as the flow leaves the cylinder instead of entering. There is also a corresponding temperature rise across the valve. Hence, if the cylinder were completely unloaded by the suction valve, the temperature of the gas would continue to rise and could possibly get hot enough to damage the valve. Thus, in one or more embodiments of the present invention, the RCS takes into account the valve losses across the suction valve for a more accurate prediction of power in machines using HydroCOMs than by using a closed-loop solution. FIG. 6 shows a detail of a sample P-V diagram of a cylinder equipped with a HydroCOM.

In one or more embodiments of the invention, for every degree of rotation of crankshaft, an additional condition may be tested to determine if the HydroCOM is acting. The embodiment of the RCS may be a computer program code excerpt such as:

IF|piston displacement|<stroke*(1−hydrocom position) (1)

THEN HydroCOM acting

FIG. 7:

Typically, there are four possible cylinder configurations that may be modeled by the RCS. If a cylinder is single acting, the compression cycle is only being performed by one end of the cylinder, either on the head end (Single Acting Head End or SAHE) or the crank end (Single Acting Crank End or SACE). If both ends of the cylinder are loaded, it is double-acting (DA). This means that the head end and the crank end are both performing compression cycles simultaneously, 180 degrees apart. A cylinder may also be non-acting (NA), which is equivalent to removing the valves from the cylinder and letting the gas flow through freely, i.e., no compression occurs in the cylinder). The example pressure variables associated with each configuration are shown in FIG. 7.

The four most important points to be calculated for each end of the cylinder on the P-V diagram are: (a) Opening of the suction valve, (b) Closing of the suction valve, (c) Opening of the discharge valve, and (d) Closing of the discharge valve.

In one or more embodiments of the invention, the P-V cycle calculation by RCS involves a numerical integration process that begins at 0 degrees crankshaft rotation, which is defined at a minimum head end cylinder volume. At this point, the head end discharge valve has just closed and the head end is about to start the expansion stroke. Between 0 and 180 degrees of crankshaft rotation, the head end undergoes the expansion and suction stroke while gas in the crank end of the cylinder experiences compression and discharge. From 180 to 360 degrees of crankshaft rotation, the strokes are reversed. The P-V cycle calculation, i.e. step 203 of FIG. 2, is applicable for both the head end and crank end compression cycle. Although FIG. 3 shows only the head end configuration, and the connecting rod associated with the head end crankshaft, one skilled in the art may easily see that the analysis is very similar to the head end configuration. The steps involved in the P-V cycle calculation of both head end and crank end configurations will be described, and the physical phenomena explained with reference to example calculation variables.

The integration process begins at 0 degrees crankshaft rotation, which is defined at the minimum head end cylinder volume. FIG. 3 also shows a head end compressor configuration in a state of 0 degree crankshaft rotation. In order to not limit the calculations to particular configurations, the P-V cycle is explained in general using a double-acting cylinder with one suction valve and one discharge valve at both the head end and the crank end.

When the compressor is the state of 0 degree crankshaft rotation, the head end discharge valve has just closed and the head end is about to start the expansion stroke. Between 0 and 180 degrees of crankshaft rotation, the head end undergoes the expansion and suction stroke, while gas in the crank end of the cylinder experiences compression and discharge. From 180 to 360 degrees of crankshaft rotation, the strokes are reversed.

FIGS. 8A, 8B, 9A, and 9B show flowcharts in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

Figure 8A:
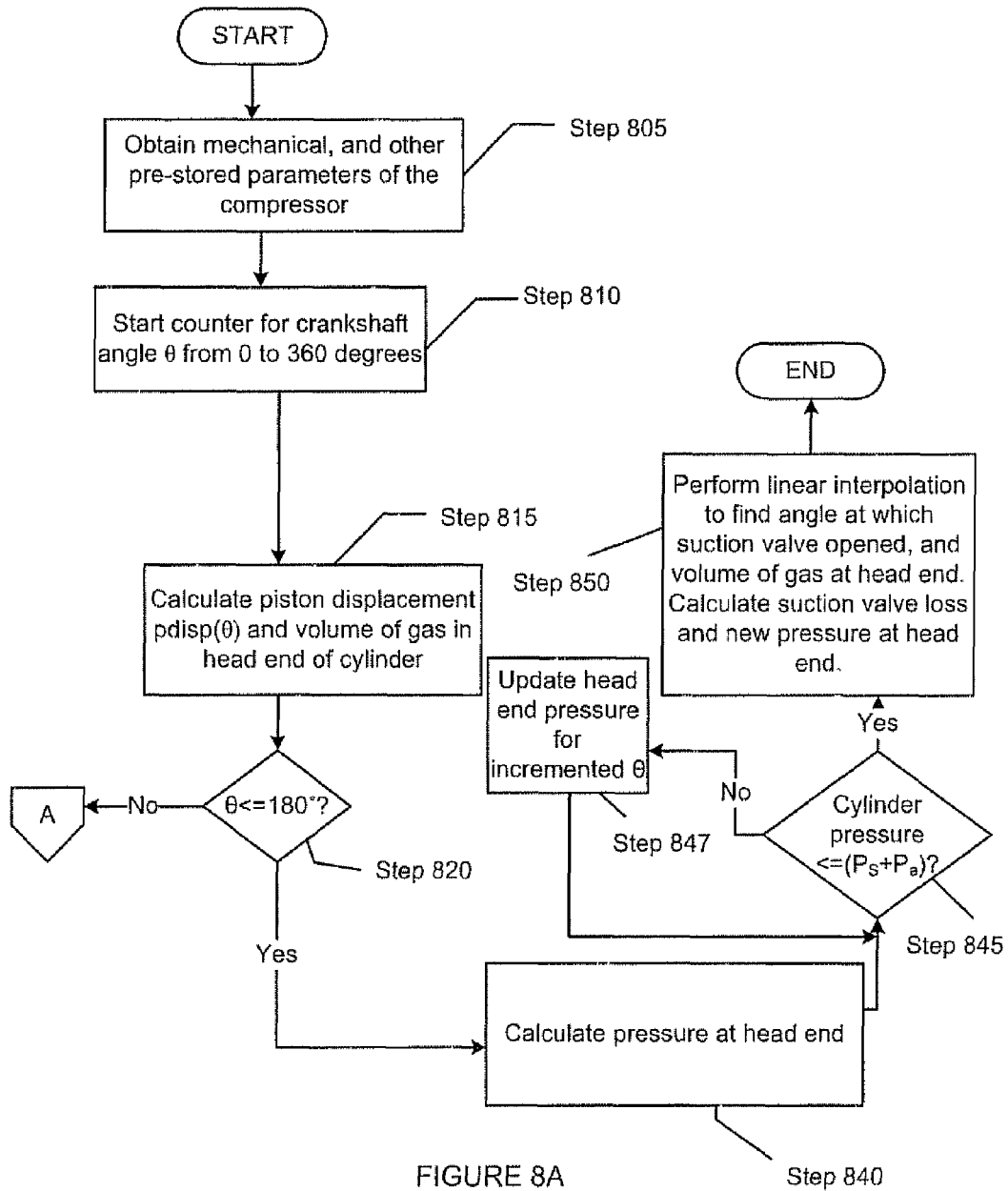
FIGS. 8A-8B show a flowchart comprising instructions required to calculate P-V variables as a function of crankshaft angle during one rotation cycle at the head end of the cylinder in a reciprocating compressor in accordance with one or more embodiments of the invention.
Figure 8B:
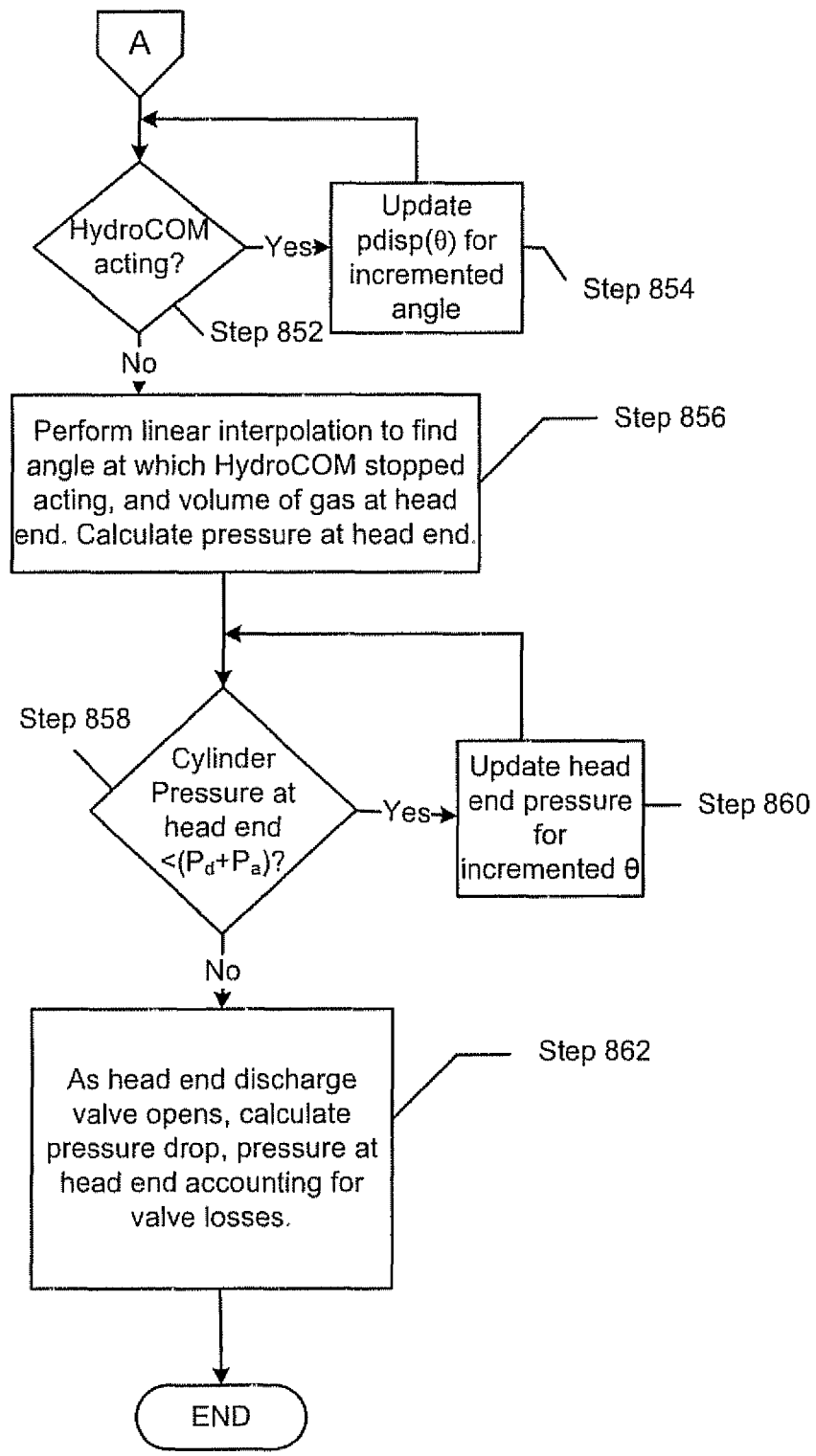

FIGS. 8A & 8B:

Referring to FIGS. 8A and 8B, FIGS. 8A and 8B show the steps involved in calculating the P-V cycle by the RCS for the compression performed in the head end of the cylinder during one crankshaft rotation cycle, with the effects of the Hydro-COM considered. Those skilled in the art will appreciate that following method may be performed without considering the HydroCOM effects, and as such, the invention should not be limited to considering the HydroCOM effects.

In Step 805 the mechanical parameters such as piston rod diameter, length of piston travel in cylinder, length of connecting rod, crankshaft rotational speed, and other such parameters, and other pre-stored parameters such as properties of the gas parameters are obtained. In Step 810, a counter for incrementing crankshaft rotational angle is started from 0 to 360 degrees, where the angle of increment may be chosen by a user. In one or more embodiments of the invention, the piston displacement is determined as shown in Step 815. As an example, the piston displacement as a function of angle may be determined from Equations 2 and 3 as:

For $90° \le \theta < 270°$, $$pdisp(\theta) = -\left[\left[\frac{stroke}{2}\right]^2 [1 - \sin^2(rad)]\right]^{1/2} + \left[conrod^2 - \sin^2(rad)\left[\frac{stroke}{2}\right]^2\right]^{1/2} \quad (2)$$

For $270° \le \theta < 90°$, $$pdisp(\theta) = \left[\left[\frac{stroke}{2}\right]^2 [1 - \sin^2(rad)]\right]^{1/2} + \left[conrod^2 - \sin^2(rad)\left[\frac{stroke}{2}\right]^2\right]^{1/2} \quad (3)$$

where $pdisp(\theta)$ is the current piston displacement typically expressed in units of meters (m), stroke is the length of piston travel in cylinder typically expressed in meters (m), rad is the angle of crankshaft rotation $\theta$ expressed in radian units (rads), conrod is the length of connecting rod typically expressed in meters (m), and sin is the trigonometric sine.

In the step 815, the volume of gas contained in the head end ($V_{HE}$) of the cylinder may now be determined using, as necessary, knowledge of the clearance percentage for both ends obtained in step 805. As an example, the volume at the head end of the cylinder, $V_{HE}$, may be expressed in the form of Equation 4.

$$V_{HE} = \left[\frac{\pi}{4}\right][bore^2 - [tailrod]^2]\left[\left[\frac{\% \ CLR_{HE}}{100}\right] * stroke - pdisp(\theta)\right] \quad (4)$$

where bore is the piston diameter or the cylinder bore diameter typically expressed in meters (m), tailrod is a tail rod diameter that is attached to an end of the piston typically expressed in meters (m), and $\% \ CLR_{HE}$ is the cylinder clearance at the head end expressed in percentage (%).

In Step 820, the crankshaft angle $\theta$ is checked as to whether it is less than 180 degrees. Since there are two possibilities, each one of them leading to different strokes, firstly the case when $\theta$ is less than 180 degrees is considered.

Step 840 may involve a calculation of the pressure at the head end of the cylinder. As the example, the pressure $P_{DA,HE}$ may be expressed in the form of Equation 5.

$$P_{DA,HE} = [Pd + Pa] * \left[ \frac{\% \ CLR_{HE}}{\% \ CLR_{HE} - \frac{pdisp(\theta)}{stroke} * 100} \right]^{kavg} \quad (5)$$

where Pd+Pa is the absolute discharge pressure expressed in kilopascals (kPa), including atmospheric pressure, and kavg is an average ratio of specific heats between suction and discharge conditions.

Equation 5 shows the expansion at the head end of the cylinder by way of pressure increasing with crankshaft angle. At some point during the stroke, the expanding gas in the head end of the cylinder will reach the pressure of the gas in the suction line. Once this occurs, and the valve losses are overcome, the head end suction valve will open. The crank angle at which this takes place may be found by comparing the pressure in the cylinder to the suction line pressure at the corresponding piston displacement of every degree of rotation.

Step 845 shows a comparison of the pressure at head end of the cylinder with the suction line pressure, Ps+Pa. If the cylinder pressure is not less than or equal to the suction line pressure, the expansion keeps continuing until the cylinder pressure becomes less than or equal to the suction line pressure. The pressure is updated for the next incremental angle until the condition is satisfied. This is shown in Step 847.

If the cylinder pressure equals or is less than the suction line pressure, a linear interpolation is performed to find a more accurate crank angle for the suction valve opening, i.e., the angle at which the suction valve opens. This is shown in Step 850. As an example, the crank angle at which the suction valve is open is expressed in the form of Equation 6. Here the angle of increment is 1 degree and is used as an example to derive Equation 6. As discussed above, the angle of increment may be changed by a user or be set to any value, and as such, is not considered limiting.

$$\text{sv\_open}\_\theta_{HE} = \frac{[Ps + Pa - P_{HE}(\text{sv\_open}_{HE} - 1)]}{[P_{HE}(\text{sv\_open}_{HE}) - P_{HE}(\text{sv\_open}_{HE} - 1)]} + \theta - 1 \quad (6)$$

where $\text{sv\_open}\_\theta_{HE}$ is the crankshaft angle at which the suction valve opens.

As an example, the corresponding volume at the head end may be calculated too in the form of Equation 7.

$$\text{sv\_open}\_V_{HE} = \qquad (7)$$
$$\frac{[V_{HE}(\theta) - V_{HE}(\theta - 1)]}{1} * [\text{sv\_open}\_\theta_{HE} - [\theta - 1]] + V_{HE}(\theta - 1)$$

where $\text{sv\_open}\_V_{HE}$ is the volume corresponding to the angle at which the suction valve opens.

As an example, the head end suction valve pressure drop may now be calculated in the form of Equation 8

$$\Delta P_{sv,HE} = \rho_{sv} \left[ \frac{v^2}{2} \right] \left[ \frac{\frac{\pi}{4}(bore^2 - tailrod^2)}{C_{sv}^2 * 1000} \right]^2 \quad (8)$$

where $\Delta P_{sv,HE}$ is the head suction value pressure drop expressed typically in kPa, $\rho_{sv}$ is the density of the gas calculated at suction conditions expressed typically in kg/m³, and $C_{sv}$ is the suction valve coefficient expressed typically in m².

The suction and discharge valve coefficients used in calculating the pressure drop across the valves are based on the effective flow area (EFA) of the valve. The EFA is defined as the flow area through an equivalent orifice plate. This value is generally related to the size of the cylinder, but may vary according to the valve manufacturer. The RCS uses standardized valve coefficients based on cylinder bore, but these values may require adjustment if the valves have been modified. As the bore gets larger, the cylinder will contain more valves and each valve will become larger (i.e. increased EFA). The Total EFA per corner is the product of the number of valves per corner of the cylinder and the EFA of each valve, as in Equation 9. This is the total flow into (or out of) one end of the cylinder.

Total EFA/corner=(No. valves/corner)*(EFA/valve) (9)

Additionally, in step 850, the difference between the head end pressure and the absolute suction pressure may be accounted for by valve losses. The cylinder pressure may be expressed in the form of Equation 10 as an example.

$$P_{DA,HE} = Ps + Pa - \Delta P_{sv,HE} \quad (10)$$

In Step 820, if the crank angle is greater than 180 degrees, i.e., the second half of the complete 360 degrees rotation of the crank shaft, the head end begins the compression stroke. As shown in FIG. 7, in step 852 any HydroCOMs present on that end of the cylinder may be checked for as per instruction (1). Only when the HydroCOM is no longer acting on the valve does the head end suction valve close. Thus, once the condition in (1) is true, the pressure at the head end may be updated for the next incremented angle until the condition becomes false, as shown in Step 854. If the condition becomes false, a precise value for the crank angle at which the HydroCOM stops acting may be found using linear interpolation as shown in Step 856. Expressed as an example Equation 11, with a 1 degree angle of increment, $$\text{sv\_close}_{HE} = \qquad (11)$$
$$\frac{1}{pdisp(\theta) - pdisp(\theta - 1)}[\text{hcom\_open} - pdisp(\theta - 1)] + \theta - 1$$

The corresponding volume of gas in the head end when the suction valve closes may also interpolated as example Equation 12, $$V_{HE}\_\text{hcom} = \qquad (12)$$
$$\frac{[V_{HE}(\theta) - V_{HE}(\theta - 1)]}{1} * [\text{sv\_close}_{HE} - [\theta - 1]] + V_{HE}(\theta - 1)$$

The head end cylinder pressure may be calculated in Step 756 as example Equation 13, $$P_{DA,HE} = [Ps + Pa] * \left[ \frac{100 + \% \ CLR_{HE}}{\% \ CLR_{HE} - \frac{pdisp(\theta)}{stroke} * 100} \right]^{kavg} \quad (13)$$

where Ps+Pa is the absolute suction pressure expressed in kilopascals (kPa).

As the gas trapped in the head end of the cylinder is compressed, the pressure and temperature rise until the pressure in the cylinder exceeds the pressure in the discharge line by enough to unseat the head end discharge valve. The point in the compression cycle at which this occurs may be found by comparing the head end cylinder pressure to the known discharge line pressure.

In step 858, a comparison may be performed. Specifically, if the cylinder pressure is less than discharge line pressure, the gas in the head end of the cylinder is still undergoing compression and the head end discharge valve is closed. The pressure may be updated for incremented angle until the comparison yields a false result, as shown in Step 860. If a HydroCOM is acting on the head end suction valve, the pressure drop across the valve may be considered.

In this case, the losses across the suction valve may be added onto the absolute suction pressure to obtain the head end cylinder pressure in the form of example Equation 14.

$$P_{DA,HE} = Ps + Pa + \Delta P_{sv,HE} \quad (14)$$

Once the HydroCOM is no longer acting, compression of the remaining volume of gas in the head end will begin.

Once the condition becomes false, the pressure in the cylinder exceeds the discharge line pressure and the head end discharge valve opens. The head end discharge valve pressure drop may be calculated in the form of example Equation 15, using the discharge valve coefficient of the given cylinder and the density of the gas calculated at discharge conditions as shown in Step 862 as $$\Delta P_{dv,HE} = \rho_{dv} \left[ \frac{v^2}{2} \right] \frac{\left[ \frac{\pi}{4}(bore^2 - rod^2) \right]^2}{C_{dv}^2 * 1000} \quad (15)$$

where $\rho_{dv}$ is the density of the gas calculated at discharge conditions expressed typically in kg/m³, and $C_{dv}$ is the discharge valve coefficient expressed typically in m².

When there is no HydroCOM acting on the head end suction valve during the compression stroke, the gas will be compressed according to example Equation 16.

$$P_{DA,HE} = \left[ \frac{[P_{HE}(\theta - 1) * V_{HE}(\theta - 1)]}{V_{HE}(\theta)} \right]^{kavg} \quad (16)$$

If the head end pressure is greater than the absolute discharge pressure, the difference must be accounted for by the valve losses. In this case $P_{DA,HE}$ may be redefined as example Equation 17 in Step 862.

$$P_{DA,HE} = Pd + Pa + \Delta P_{dv,HE} \quad (17)$$

Figure 9A:
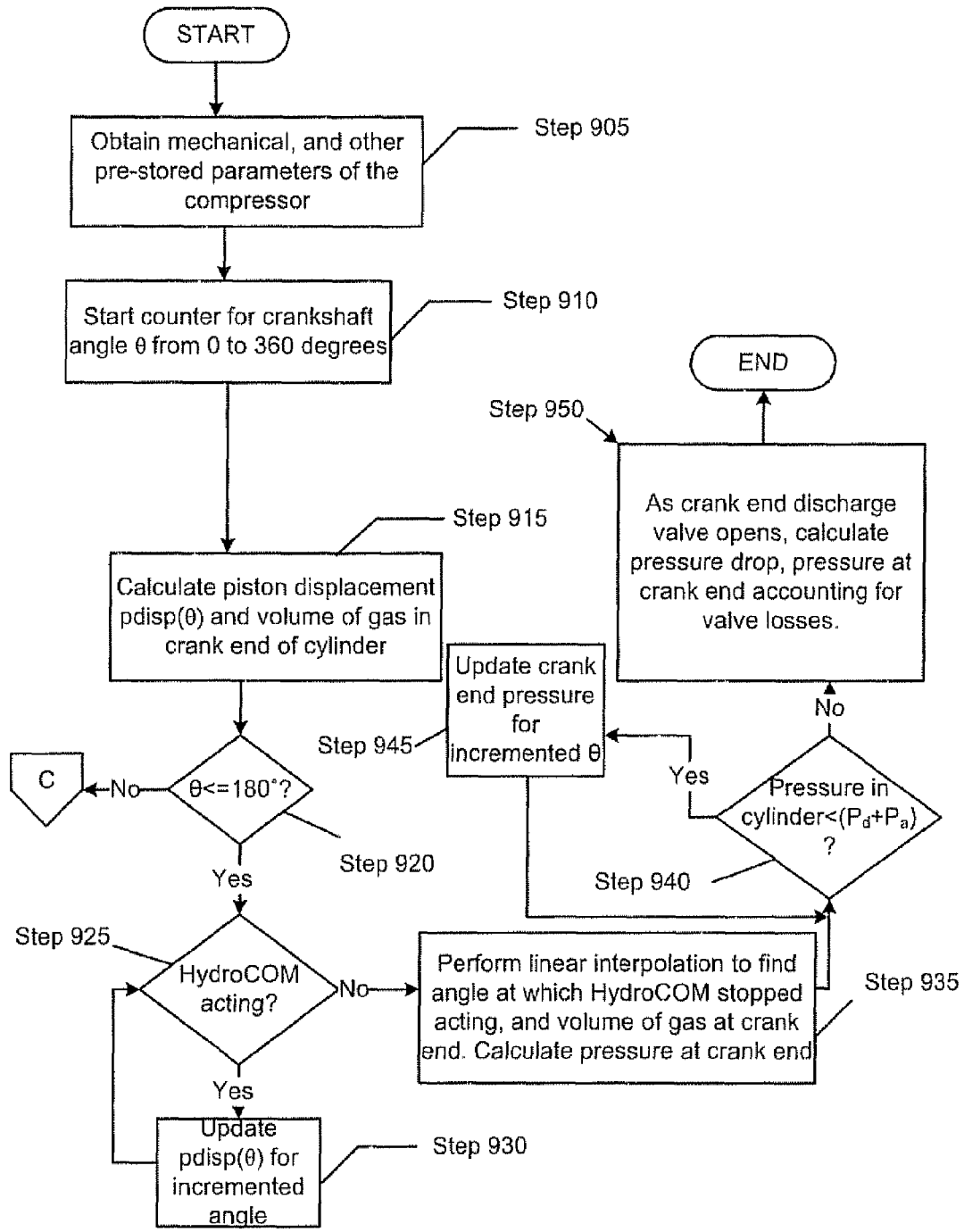
FIGS. 9A-9B shows a flowchart comprising instructions required to calculate P-V variables as a function of crankshaft angle during one rotation cycle at the crank end of the cylinder in a reciprocating compressor in accordance with one or more embodiments of the invention.
Figure 9B:
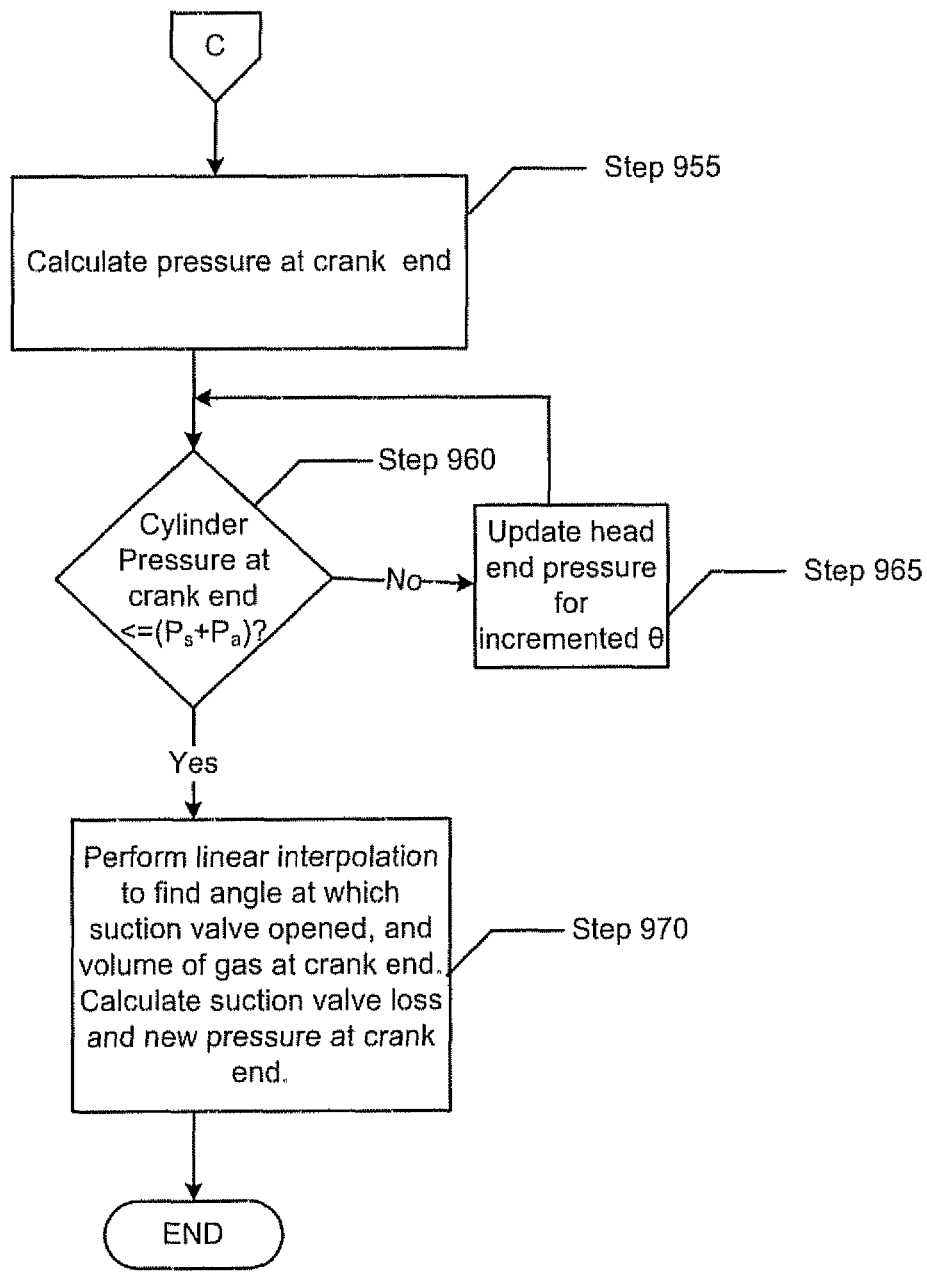

FIGS. 9A and 9B:

FIGS. 9A and 9B show the steps involved in calculating the P-V cycle by the RCS for the compression performed in the head end of the cylinder during one crankshaft rotation cycle, with the effects of the HydroCOM considered. Again, it is obvious to one skilled in the art to see that the calculations may be performed without considering the HydroCOM effects, and as such, the invention should not be limited to considering the HydroCOM effects. The calculations for the head end and crank end compression cycles may also be conducted simultaneously.

In Step 905 the mechanical parameters, and other pre-stored parameters such as properties of the gas parameters are obtained. In Step 910, a counter for incrementing crankshaft rotational angle is started from 0 to 360 degrees, where the angle of increment may be chosen by a user. In one or more embodiments of the invention, the piston displacement is determined as shown in Step 915, similar to Step 815 of FIG. 7.

In the same Step 915, the volume of gas contained in the crank end of the cylinder, $V_{CE}$, may be expressed as Equation 18 as an example.

$$V_{CE} = \left[\frac{\pi}{4}\right][bore^2 - rod^2][stroke]\left[1 + \left[\frac{\% \ CLR_{CE}}{100}\right] + \left[\frac{pdisp(\theta)}{stroke}\right]\right] \quad (18)$$

where rod is the piston rod diameter typically expressed in meters (m).

In Step 920, the crankshaft angle θ is checked to determine whether it is less than 180 degrees. Since there are two possibilities, each one of them leads to different strokes.

As the crank end is just beginning the compression stroke, any HydroCOMs present on that end of the cylinder may be acting. This condition may be tested first, as in Instruction (1), and Step 925. Only when it has been determined that the HydroCOM is no longer acting on the stroke will the crank end suction valve close. When a HydroCOM is acting, the piston displacement may be updated for incremented angles until the HydroCOM stops acting. This is shown in Step 930.

If the HydroCOM stops acting, a simple linear interpolation may be performed to find the exact crank angle at which the HydroCOM stops acting as shown in Step 935, and example Equation 19.

$$sv\_close\_\theta_{CE} = \frac{1}{pdisp(\theta) - pdisp(\theta - 1)}[hcom\_open - pdisp(\theta - 1)] + \theta - 1 \quad (19)$$

where $sv\_close\_\theta_{CE}$ is the angle at which the HydroCOM stops acting, and hcom_open is the point of HydroCOM opening, which may in turn be expressed as example Equation 20 as:

$$hcom\_open = stroke * (1 - hcom\_pos) \quad (20)$$

where hcom_pos is the fraction of stroke when HydroCOM is acting.

An interpolation to determine the corresponding cylinder volume may also be performed during Step 935. For the closing of the crank end suction valve, the volume of gas in the crank end may be interpolation as example Equation 21:

$$V_{CE\_hcom} = \frac{[V_{CE}(\theta) - V_{CE}(\theta - 1)]}{1} * [sv\_close\_\theta_{CE} - [\theta - 1]] + V_{CE}(\theta - 1) \quad (21)$$

The crank end cylinder pressure may be calculated in Step 935 as example Equation 22.

$$P_{DA,CE} = [Ps + Pa] * \left[ \frac{100 + \% \, CLR_{CE}}{100 + \% \, CLR_{CE} + \frac{pdisp(\theta)}{stroke} * 100} \right]^{kavg} \quad (22)$$

where Ps+Pa is the absolute suction pressure expressed in kilopascals (kPa).

During this time, the gas in the crank end of the cylinder is being compressed from suction pressure to discharge pressure. As the gas is compressed, it will reach the pressure of the discharge line, and with a small amount of differential pressure to overcome the corresponding pressure drop, the gas may open the discharge valve. The point at which this occurs may be found by comparing the crank end cylinder pressure to the known discharge line pressure.

As shown in Step 940, the cylinder pressure is compared with the absolute suction pressure. If the cylinder pressure is less than the absolute suction pressure, the crank end discharge valve is closed. As shown in Step 945, the pressure is updated for incremented angles until the cylinder pressure becomes more than the absolute suction pressure. Once this occurs, the pressure in the crank end of the cylinder exceeds the discharge line pressure and the valve opens. The crank end discharge valve pressure drop may now be calculated as shown in Step 950 in the form of example Equation 23, using the discharge valve coefficient of the given cylinder and the density of the gas calculated at discharge conditions as, $$\Delta P_{dv,CE} = \rho_{dv} \left[ \frac{v^2}{2} \right] \frac{\left[ \frac{\pi}{4}(bore^2 - rod^2) \right]^2}{C_{dv}^2 * 1000} \quad (23)$$

If the compressor is equipped with a HydroCOM during the compression stroke, it may still be acting on the crank end suction valve. If there is a HydroCOM present, the pressure drop across the crank end suction valve must now be considered while the valve remains open during part of the compression stroke. The pressure drop may be expressed as example Equation 24.

$$\Delta P_{sv,CE} = \rho_{sv} \left( \frac{v^2}{2} \right) \frac{\left[ \frac{\pi}{4}(bore^2 - rod^2) \right]^2}{C_{sv}^2 * 1000} \quad (24)$$

As the gas is now flowing out of the cylinder through the suction valve, the losses across the suction valve may be added to the suction pressure to find the cylinder pressure until the HydroCOM is no longer acting on the valve. The pressure may be expressed as example Equation 25.

$$P_{DA,CE} = Ps + Pa + \Delta P_{sv,CE} \quad (25)$$

If the compressor is not equipped with a HydroCOM, it is only required to calculate the pressure. At $\theta=0$, the crank end of the cylinder is known to be at maximum volume since the piston is at top dead center (TDC). Thus, at this point, the crank end pressure may be expressed as example Equation 26.

$$P_{DA,CE} = Ps + Pa \, (\text{for } \theta=0) \quad (26)$$

Otherwise, the pressure may be expressed in Step 850 as example Equation 27.

$$P_{DA,CE} = \left[ \frac{[P_{CE}(\theta-1) * V_{CE}(\theta-1)]}{V_{CE}(\theta)} \right]^{kavg} \quad (27)$$

(for $0 < \theta <= 180$)

If the crank end pressure is greater than the absolute discharge pressure, the difference must be accounted for by the valve losses. In this case $P_{DA,CE}$ may be redefined as example Equation 28:

$$P_{DA,CE} = Pd + Pa + \Delta P_{dv,CE} \quad (28)$$

In Step 920, if the crank angle is greater than 180 degrees, i.e., the second half of the complete 360 degrees rotation of the crank shaft, the crank end begins the expansion stroke. The cylinder pressure may be calculated in Step 955 as example Equation 29.

$$P_{DA,CE} = [Pd + Pa] * \left[ \frac{\% \, CLR_{CE}}{100 + \% \, CLR_{CE} + \frac{pdisp(\theta)}{stroke} * 100} \right]^{kavg} \quad (29)$$

The gas in the crank end expands back to suction pressure. The crank end suction valve will open when the cylinder pressure is less than or equal to the absolute suction pressure. This condition may be tested for in Step 960. If false, the pressure is updated for incremented angles until the condition becomes true as shown in Step 965. When true, the crank angle at which the cylinder pressure equals absolute suction pressure may be obtained in Step 970 by a simple linear interpolation as shown in example Equation 30.

$$\text{sv\_open\_}\theta_{CE} = \frac{Ps + Pa - P_{CE}(\text{sv\_open}_{CE} - 1)}{P_{CE}(\text{sv\_open}_{CE}) - P_{CE}(\text{sv\_open}_{CE} - 1)} + \theta - 1 \quad (30)$$

The corresponding volume may also be obtained by another interpolation as shown in example Equation 31 with a 1 degree angle of increment.

$$\text{sv\_open\_}V_{CE} = \quad (31)$$
$$\frac{V_{CE}(\theta) - V_{CE}(\theta-1)}{1} * [\text{sv\_open\_}\theta_{CE} - (\theta-1)] + V_{CE}(\theta-1)$$

The crank end suction valve pressure drop may be determined from example Equation 32 using the suction valve coefficient and the density of the gas calculated at suction conditions.

$$\Delta P_{sv,CE} = \rho_{sv} \left[ \frac{v^2}{2} \right] \frac{\left[ \frac{\pi}{4}(bore^2 - tailrod^2) \right]^2}{C_{sv}^2 * 1000} \quad (32)$$

If the crank end cylinder pressure is less than absolute suction pressure, the difference may be accounted for by the losses across the suction valve. The cylinder pressure may be expressed as example Equation 33 as, $$P_{DA,CE} = Ps + Pa - \Delta P_{sv,CE} \quad (33)$$

Equations 4 through 33 define the points on the P-V diagram for each angle of rotation of the crankshaft. In one or more embodiments of the invention, the data may thus be used not only for creating an accurate representation of the P-V diagram, but also as the basis for conducting a road load analysis using the RCS. Before discussing the rod load analysis, calculating power losses and temperature rise across valves is discussed below.

In one or more embodiments of the invention, the RCS may also calculate power losses imposed by the suction and discharge valve from the pressure drop across each valve discussed above.

When the angle is between 0 and 180 degrees, the power losses may be calculated for successive angles in the form of example Equations 34 and 35.

$$\dot{W}_{loss(sv,HE)} = \dot{W}_{loss(sv,HE)} + \left[\frac{V_{HE}(\theta) - V_{HE}(\theta - 1)}{60}\right] * N * \Delta P_{sv,HE} \quad (34)$$

$$\dot{W}_{loss(dv,CE)} = \dot{W}_{loss(dv,CE)} + \left|\frac{V_{CE}(\theta) - V_{CE}(\theta - 1)}{60}\right| * N * \Delta P_{dv,CE} \quad (35)$$

where N is the crankshaft rotational speed expressed typically in revolutions per minute (rpm).

In one or more embodiments of the invention, the effects of a HydroCOM may be considered in the power loss due to the recycle through the crank end suction valve as example Equation 36.

$$\dot{W}_{loss(sv,CE)}\_hcom = \quad (36)$$
$$\dot{W}_{loss(sv,CE)}\_hcom + \left|\frac{V_{HE}(\theta) - V_{HE}(\theta - 1)}{60}\right| * N * \Delta P_{sv,CE}$$

When the angle is between 180 and 360 degrees, the power losses may be expressed in the form of example Equations 37 and 38.

$$\dot{W}_{loss(dv,HE)} = \dot{W}_{loss(dv,HE)} + \left[\frac{V_{HE}(\theta) - V_{HE}(\theta - 1)}{60}\right] * N * \Delta P_{dv,HE} \quad (37)$$

$$\dot{W}_{loss(sv,CE)} = \dot{W}_{loss(sv,CE)} + \left|\frac{V_{CE}(\theta) - V_{CE}(\theta - 1)}{60}\right| * N * \Delta P_{sv,CE} \quad (38)$$

In one or more embodiments of the invention, the effects of a HydroCOM may be considered in the power loss due to the recycle through the head end suction valve as example Equation 39.

$$\dot{W}_{loss(sv,CE)}\_hcom = \quad (39)$$
$$\dot{W}_{loss(sv,CE)}\_hcom + \left|\frac{V_{HE}(\theta) - V_{HE}(\theta - 1)}{60}\right| * N * \Delta P_{sv,CE}$$

In one or more embodiments of the invention, in order to calculate the temperature rise across each set of valves, the mass flow rate of gas through each end of the cylinder may be calculated according to example Equations 40-43. It is to be noted that all flows may be calculated with respect to the suction end of the P-V diagram.

$$\dot{m}_{HE} = \frac{|sv\_open\_V_{HE} - V_{HE}(180°)| * N * \rho_s}{60} \quad (40)$$

$$\dot{m}_{CE} = \frac{|sv\_open\_V_{CE} - V_{CE}(0°)| * N * \rho_s}{60} \quad (41)$$

$$\dot{m}_{HE}\_hcom = \frac{|sv\_open\_V_{HE} - V_{HE}(180°)| * N * \rho_s}{60} \quad (42)$$

$$\dot{m}_{CE}\_hcom = \frac{|sv\_open\_V_{CE} - V_{CE}(0°)| * N * \rho_s}{60} \quad (43)$$

In one or more embodiments of the invention, for each end of the cylinder that has a positive mass flow rate, the temperature rise may be calculated across the suction valves, acting HydroCOMs, and discharge valves using the form of example Equations 44-49.

$$\Delta T_{sv,HE} = \frac{\dot{W}_{loss(sv,HE)}}{(c_{p,s})(\dot{m}_{HE})} \quad (44)$$

$$\Delta T_{sv,HE}\_hcom = \frac{\dot{W}_{loss(sv,HE)}\_hcom}{(c_{p,s})(\dot{m}_{HE}\_hcom)} \quad (45)$$

$$\Delta T_{dv,HE} = \frac{\dot{W}_{loss(dv,HE)}}{(c_{p,d})(\dot{m}_{HE})} \quad (46)$$

$$\Delta T_{sv,CE} = \frac{\dot{W}_{loss(sv,CE)}}{(c_{p,s})(\dot{m}_{CE})} \quad (47)$$

$$\Delta T_{sv,CE}\_hcom = \frac{\dot{W}_{loss(sv,CE)}\_hcom}{(c_{p,s})(\dot{m}_{CE}\_hcom)} \quad (48)$$

$$\Delta T_{dv,CE} = \frac{\dot{W}_{loss(dv,CE)}}{(c_{p,d})(\dot{m}_{CE})} \quad (49)$$

Here the subscripts s and d refer to suction and discharge valves. $c_p$ and $c_v$ refer to the specific heat of gas at constant pressure and volume respectively, and are typically expressed in kJ/kg·K.

In one or more embodiments of the invention, if HydroCOMs are acting then the temperature rise caused by flow back through the valve may be added to the suction valve temperature rise for each end as shown in example Equations 50 and 51.

$$\Delta T_{sv,HE} = \Delta T_{sv,HE} + \Delta T_{sv,HE}\_hcom \quad (50)$$

$$\Delta T_{sv,HE} = \Delta T_{sv,HE} + \Delta T_{sv,HE}\_hcom \quad (51)$$

In one or more embodiments of the inventions, the Performance Report of the compressor system may involve calculations of average temperature rises through valves. These may be obtained by summing the temperature rise across each set of valves in one stage and dividing by the number of acting cylinder ends (e.g., DA=2, SA=1) in the same stage. The same calculation method applies on a per cylinder basis. Equations 52-55 are shown as example average temperature rises.

$$\Delta T_{sv,cyl} = \frac{\Delta T_{sv,HE} + \Delta T_{sv,CE}}{\beta} \quad (52)$$

$$\Delta T_{dv,cyl} = \frac{\Delta T_{dv,HE} + \Delta T_{dv,CE}}{\beta} \quad (53)$$

$$\Delta T_{sv,stg} = \frac{\sum_{stg} \Delta T_{sv,cyl}}{\sum_{stg} \beta} \quad (54)$$

$$\Delta T_{dv,stg} = \frac{\sum_{stg} \Delta T_{dv,cyl}}{\sum_{stg} \beta} \quad (55)$$

The subscripts "stg" refers to stage, and cyl refers to cylinder. Here β refers to the number of acting ends in the cylinder.

In one or more embodiments of the invention, the total power losses across the suction and discharge valves for each stage may be given by the sum of the losses from each end of each cylinder. Equations 56-57 are shown as an example.

$$\dot{W}_{loss,sv(stg)} = \sum_{stg} \left( \dot{W}_{loss(sv,HE)} + \dot{W}_{loss(sv,CE)} \right) \quad (56)$$

$$\dot{W}_{loss,dv(stg)} = \sum_{stg} \left( \dot{W}_{loss(dv,HE)} + \dot{W}_{loss(dv,CE)} \right) \quad (57)$$

In one or more embodiments of the invention, the P-V calculations may also serve as a basis to calculate the theoretical power consumed by a compressor, which may be defined as the area enclosed within its P-V diagram. As discussed above, to obtain accurate power predictions, the Reciprocating Compressor Simulator performs a numerical integration of the P-V diagram generated in the previous section. This integration may performed using the trapezoidal rule, which is one of the Newton-Cotes closed integration formulas. The general formula for integrating the P-V diagram using this method may be expressed by example Equations 58 and 59 as $$\dot{W}_{HE} = \left| \frac{V_{HE}(\theta) - V_{HE}(\theta-1)}{60} \right| * \quad (58)$$
$$N * \left[ \frac{P_{HE}(\theta') - P_{HE}(\theta) + P_{HE}(\theta'+1) - P_{HE}(\theta-1)}{2} \right]$$

$$\dot{W}_{CE} = \left| \frac{V_{CE}(\theta) - V_{CE}(\theta-1)}{60} \right| * \quad (59)$$
$$N * \left[ \frac{P_{CE}(\theta') - P_{CE}(\theta) + P_{CE}(\theta'+1) - P_{CE}(\theta-1)}{2} \right]$$

Here θ and θ' are the lower and upper angle limits of integration, and the incremental angle shown as 1 for example purposes.

Thus, in one or more embodiments of the invention, with substitution of appropriate variables, the head end and crank end P-V diagrams of each cylinder may be integrated separately and then added together to give the total power consumption of each cylinder, each stage, and the entire compressor. Supplemental equations may be expressed as example Equations 60-62.

Average power consumed may be expressed as $$\dot{W}_{cyl} = \frac{\dot{W}_{HE} + \dot{W}_{CE}}{\eta_{mech}} \quad (60)$$

Here $\eta_{mech}$ is the mechanical efficiency of the compressor.

$$\dot{W}_{stg} = \sum_{stg} \dot{W}_{cyl} \quad (61)$$

$$\dot{W}_{overall} = \sum \dot{W}_{cyl} \quad (62)$$

In one or more embodiments of the invention, the theoretical flow through each stage of the compressor may be calculated. Since the cylinder volumes where the suction valve opens and closes precisely define the suction portion of the P-V diagram, it is possible to determine the flow based on the suction valve action and the gas properties at suction conditions. It is to be noted that by the same theory, it is also possible to determine the flow based on the discharge portion of the P-V diagram.

If the compressor has acting HydroCOMs, a calculation may be performed to determine the amount of flow is lost through the cylinder due to the HydroCOM recycling the flow back to the suction line. Equations of flow loss due to Hydro-COM 63 and 64 are shown as examples.

$$Q_{std,HE\_hcom} = \left[ \frac{V_{HE}(180°) - V_{HE\_hcom}}{[273.15 + T_s + \Delta T_{sv,HE}]\left[\frac{288.15}{101.325}\right][P_s + P_a][Z_s]} * \right. \quad (63)$$
$$\left. \frac{24}{1000} \right] * N * 60$$

$$Q_{std,CE\_hcom} = \left[ \frac{V_{CE}(0°) - V_{CE\_hcom}}{[273.15 + T_s + \Delta T_{sv,CE}]\left[\frac{288.15}{101.325}\right][P_s + P_a][Z_s]} * \right. \quad (64)$$
$$\left. \frac{24}{1000} \right] * N * 60$$

The flow is typically expressed in cubic meters/hour (m³/h). Zs is the suction valve resistance.

In one or more embodiments of the invention, when the flows are calculated based on the suction portion of the P-V diagram, the temperature rise across the valve is accounted for by breaking the equation into two terms as shown above. The temperature rise is added into the first term, at the point where the suction valve normally closes (maximum cylinder volume), but not into the second term as no temperature rise has occurred at that point. This method represents a linear approximation of the temperature rise across the valve as gas is flowing through.

Actual flow through cylinder may be expressed as example Equations 65 and 66.

$$Q_{std,HE} = \left[ \frac{V_{HE}(180°)}{[273.15 + T_s + \Delta T_{sv,HE}]\left[\frac{288.15}{101.325}\right][P_s + P_a][Z_s]} * \frac{24}{1000} - \right. \quad (65)$$
$$\left. \frac{sv\_open\_V_{HE}}{[273.15 + T_s]\left[\frac{288.15}{101.325}\right][P_s + P_a][Z_s]} * \frac{24}{1000} \right] * N * 60$$

-continued $$Q_{std,CE} = \left[\frac{V_{CE}(0°)}{[273.15 + Ts + \Delta T_{sv,CE}]\left[\frac{288.15}{101.325}\right][Ps + Pa][Zs]} * \frac{24}{1000} - \frac{sv\_open\_V_{CE}}{[273.15 + Ts]\left[\frac{288.15}{101.325}\right][Ps + Pa][Zs]} * \frac{24}{1000}\right] * N * 60 \quad (66)$$

The theoretical flow through each stage of the compressor may then be expressed as the sum of the flows through each cylinder in the stage, accounting for any HydroCOM recycle, as shown in example Equation 67.

$$Q_{std,stg} = \sum_{cyl} (Q_{std,HE} + Q_{std,CE} - Q_{std,HE}\_hcom - Q_{std,CE}\_hcom) \quad (67)$$

In one or more embodiments of the invention, the volumetric efficiency of each cylinder may also be calculated by the RCS using the volumes calculated for the opening and closing of valves on the generated P-V diagram. The exact crank angles for opening of the suction valves may be used. The volumetric efficiency may be expressed as example Equations 68 and 69.

$$\eta_{v,HE} = \frac{V_{HE}(180°) - sv\_open\_V_{HE}}{V_{HE}(180°) - V_{HE}(0°)} \quad (68)$$

$$\eta_{v,CE} = \frac{V_{CE}(0°) - sv\_open\_V_{CE}}{V_{CE}(0°) - V_{CE}(180°)} \quad (69)$$

The theoretical discharge temperature of the gas in each cylinder is based on the first principle thermodynamic equation for temperature increase of a compressed gas. At the moment the discharge valve opens, the temperature in the cylinder may be given by example Equation (70) as $$Td_{valve} = [Ts + 273.15 + \Delta T_{sv,cyl}]\left[\frac{Pd + Pa}{Ps + Pa}\right]^{\frac{kavg-1}{kavg}} - 273.15 \quad (70)$$

Note that here temperature is in Kelvins (K).

The RCS may account for the temperature rise through both the suction and discharge valves, as discussed above. Thus, for each cylinder, the theoretical discharge temperature may be calculated as example Equation (71) in accordance with one or more embodiments of the invention.

$$Td_{valve} = [Ts + 273.15 + \Delta T_{sv,cyl}]\left[\frac{Pd + Pa}{Ps + Pa}\right]^{\frac{kavg-1}{kavg}} - 273.15 + \Delta T_{dv,cyl} \quad (71)$$

The theoretical discharge temperature of each stage may then be expressed as the average of the discharge temperature of each cylinder.

$$Td = \frac{\sum_{stg} Td_{cyl}}{\sum_{stg} cyl} \quad (72)$$

As discussed above, the RCS may also be capable of calculating the total loads on the piston rods of a compressor given the weight of the reciprocating assembly and the information determined while creating the P-V diagram. The RCS may also be expanded to include the calculation of the loads on the connecting rod and connecting rod bolts.

In one or more embodiments of the invention, the angle of the connecting rod is a function of the angle of rotation of the crankshaft and is given by example Equation 73:

$$\phi = \arctan\left[\frac{\frac{\sin(rad) * stroke}{2 * conrod}}{\left[-\left[\frac{\sin(rad) * stroke}{2 * conrod}\right]\left[\frac{\sin(rad) * stroke}{2 * conrod}\right] + 1\right]^{1/2}}\right] \quad (73)$$

In one or more embodiments of the invention, the equations for velocity and acceleration of the reciprocating assembly defined at the crosshead, and the angular velocity and angular acceleration of the connecting rod may be derived by kinematics and expressed as example Equations 74-77.

Angular Velocity of Connecting Rod:

$$\omega = \left[\frac{2\pi N}{60}\right]\left[\frac{stroke}{2}\right]\left[\frac{\cos(rad)}{\cos(\phi) * conrod}\right] \quad (74)$$

Velocity at Crosshead:

$$v = \left[\frac{2\pi N}{60}\right]\left[\frac{stroke}{2}\right]\sin(rad) + \omega * conrod * \sin(\phi) \quad (75)$$

Angular Acceleration of Connecting Rod:

$$\alpha = \left[\frac{2\pi N}{60}\right]^2\left[\frac{stroke}{2}\right]\left[\frac{\sin(rad)}{\cos(\phi) * conrod}\right] - \omega^2 \tan(\phi) \quad (76)$$

Acceleration at Crosshead:

$$a = \left[\frac{2\pi N}{60}\right]^2\left[\frac{stroke}{2}\right]\left[\frac{\cos(rad) + stroke}{2 * conrod} * \cos(2 * rad)\right] \quad (77)$$

In one or more embodiments of the invention, the data displayed in the Rod Load Report may include the inertia load, pressure load, and total load. These loads are calculated for each degree of crankshaft rotation for each cylinder in a compressor.

The inertia load is defined as the load created by the dynamic forces required to accelerate the mass of the piston and rod assembly, otherwise called the reciprocating mass. The reciprocating mass is defined as the sum of the masses of the following components: piston, piston rod, piston nut, crosshead, crosshead pin, crosshead nut, and balance mass.

The inertia load may then be defined as a function of the rotation of the crankshaft and expressed in example Equation 78 as:

$$\vec{F}_I(\theta) = m_{recip} * a \quad (78)$$

Here $m_{recip}$ is the reciprocating mass typically expressed in kilograms (kg).

The pressure load, or internal gas load, is the force on the piston resulting from the compression of the gas in the cylinder. As the gas is compressed, the resulting pressure force increases. The pressure load includes the static load, which is the load due to the difference in pressure across the piston, calculated at the maximum suction and discharge pressure in the cylinder. Valve losses are not taken into account for the calculation of static load as the pressure may be measured by gauges on the outside of the compressor. This condition will exist when the compressor is pressurized but not operating. The static load may thus be defined for each cylinder configuration independent of the rotation of the crankshaft.

The internal gas load may be mathematically defined similarly to the static load, except that the internal gas load accounts for the internal pressure drop due to valve losses and is dependent entirely on the pressure within the cylinder at any given angle of rotation of the crankshaft. The following example Equations 79-90 present the static load and internal gas load for all four different cylinder configurations.

SAHE (Single Acting Head End):

$$\vec{F}_{static, tension} = \left[-(Ps+Pa)\frac{\pi}{4}*bore^2 + (Ps+Pa)\frac{\pi}{4}(bore^2 - rod^2)\right]*1000 \quad (79)$$

$$\vec{F}_{static, compression} = \left[-(Pd+Pa)\frac{\pi}{4}*bore^2 + (Ps+Pa)\frac{\pi}{4}(bore^2 - rod^2)\right]*1000 \quad (80)$$

$$\vec{F}_P(\theta) = \left[-P_{DA,HE}*\frac{\pi}{4}*bore^2 + P_{SA}*\frac{\pi}{4}(bore^2 - rod^2)\right]*1000 \quad (81)$$

SACE (Single Acting Crank End):

$$\vec{F}_{static, tension} = \left[-(Ps+Pa)\frac{\pi}{4}*bore^2 + (Pd+Pa)\frac{\pi}{4}(bore^2 - rod^2)\right]*1000 \quad (82)$$

$$\vec{F}_{static, compression} = \left[-(Ps+Pa)\frac{\pi}{4}*bore^2 + (Ps+Pa)\frac{\pi}{4}(bore^2 - rod^2)\right]*1000 \quad (83)$$

$$\vec{F}_P(\theta) = \left[-P_{SA}*\frac{\pi}{4}*bore^2 + P_{DA,CE}*\frac{\pi}{4}(bore^2 - rod^2)\right]*1000 \quad (84)$$

DA (Double Acting):

$$\vec{F}_{static, tension} = \left[-(Ps+Pa)\frac{\pi}{4}*bore^2 + (Pd+Pa)\frac{\pi}{4}(bore^2 - rod^2)\right]*1000 \quad (85)$$

$$\vec{F}_{static, compression} = \left[-(Pd+Pa)\frac{\pi}{4}*bore^2 + (Ps+Pa)\frac{\pi}{4}(bore^2 - rod^2)\right]*1000 \quad (86)$$

$$\vec{F}_P(\theta) = \left[-P_{DA,HE}*\frac{\pi}{4}*bore^2 + P_{DA,CE}*\frac{\pi}{4}(bore^2 - rod^2)\right]*1000 \quad (87)$$

NA (Non-Acting):

$$\vec{F}_{static, tension} = \left[-(Ps+Pa)\frac{\pi}{4}*bore^2 + (Ps+Pa)\frac{\pi}{4}(bore^2 - rod^2)\right]*1000 \quad (88)$$

$$\vec{F}_{static, compression} = \left[-(Ps+Pa)\frac{\pi}{4}*bore^2 + (Ps+Pa)\frac{\pi}{4}(bore^2 - rod^2)\right]*1000 \quad (89)$$

$$\vec{F}_P(\theta) = \left[-P_{SA}*\frac{\pi}{4}*bore^2 + P_{SA}*\frac{\pi}{4}(bore^2 - rod^2)\right]*1000 \quad (90)$$

The total load on the piston rod may then be expressed the algebraic sum of the inertia load and the internal gas load for every degree of rotation of the crankshaft as shown in example Equation 91

$$\vec{F}_{rod}(\theta) = \Sigma(\vec{F}_I(\theta) + \vec{F}_P(\theta)) \quad (91)$$

Figure 10:
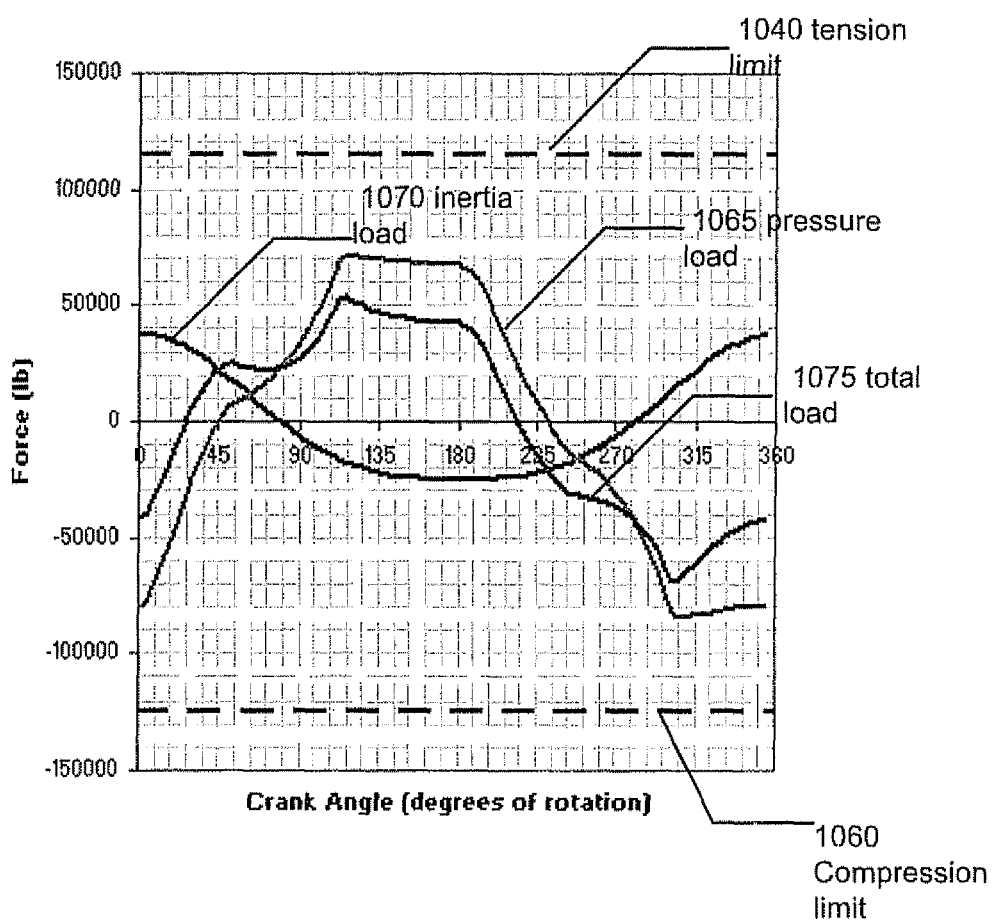
FIG. 10 shows an example of a Rod Load Report in accordance with one embodiment of the invention.

FIG. 10:

FIG. 10 shows an example of how the inertia load 1070, pressure load 1065 and total load 1075 may be presented as a Rod Load Report. It is obvious to one skilled in the art to see that it is possible to graphically determine the total load 1075 given the inertia and pressure load diagrams. The inertia and pressure loads tend to oppose each other, especially near TDC and BDC. This is important for balancing the load on the piston rod and keeping the total load within the allowable limits for tension (1040) and compression (1060) specified by the manufacturer. It is undesirable to run a reciprocating compressor at very high pressures and low speeds or at very high speed with little or no pressure load, as balance is not achieved in those conditions.

As discussed above, reversal of load between tension and compression in the piston rod is required at the crosshead pin and bushing for adequate lubrication of the joint. In one or more embodiments of the invention, the number of degrees of rod reversal may be calculated by the RCS by checking the total load at each degree of crankshaft rotation. If the load is positive, a counter for degrees of positive load may be incremented, and likewise a counter for degrees of negative load may be incremented if the total load is negative. The smallest number of the two counters is the degrees of reversal. Points of load reversal may be located at angles where the total rod load is 0.

It is to be noted that the force reversal does not occur at the same crank angle as the pressure reversal due to different piston surface areas between head end and crank end. Also, while the inertia load is a reversing load by definition, the internal gas load is not always a reversing load, depending on the configuration of the cylinder.

In one or more embodiments of the invention, at the end of the calculation loop for each degree of crankshaft rotation, each loading type may be compared to a variable holding the previous maximum and minimum load. The final values may then be displayed on the Rod Load Report in addition to the diagrams.

The RCS may also calculate the loads on the connecting rod due to the horizontal acceleration of the connecting rod. In the same way as the piston rod load is measured at the crosshead pin, the load on the connecting rod is measured at the main bushing where the connecting rod joins to the crankshaft. The acceleration may be expressed as example Equation 92

$$a_{horiz,cr} = \left[\frac{2\pi N}{60}\right]^2 * \frac{stroke}{2} * \cos(rad) - \frac{\alpha}{4} * conrod * \sin(\phi) + \frac{\omega^2}{4} * conrod * \cos(\phi) \quad (92)$$

Here φ is the connecting rod angle expressed in radians.

If the weight of the connecting rod has been defined, the load may now be determined by summing the product of the connecting rod mass and acceleration for every degree of crankshaft rotation and expressed as example Equation (93)

$$\vec{F}_{cr}(\theta) = \sum \frac{m_{cr} * a_{horiz,cr}}{\cos(\phi)} \quad (93)$$

Here $m_{cr}$ is the connecting rod mass typically expressed in kg.

Unlike the piston rod, which is one piece and commonly threaded at both ends, the connecting rod may be made of two pieces which are bolted together: the rod and the cap. If the bolted joint fails, the piston may be pushed into the cylinder head and resulting in a catastrophic failure with loss of containment. In one or more embodiments of the invention, the RCS may include instructions based on the necessary equations for analyzing the bolted joint.

Figure 11:
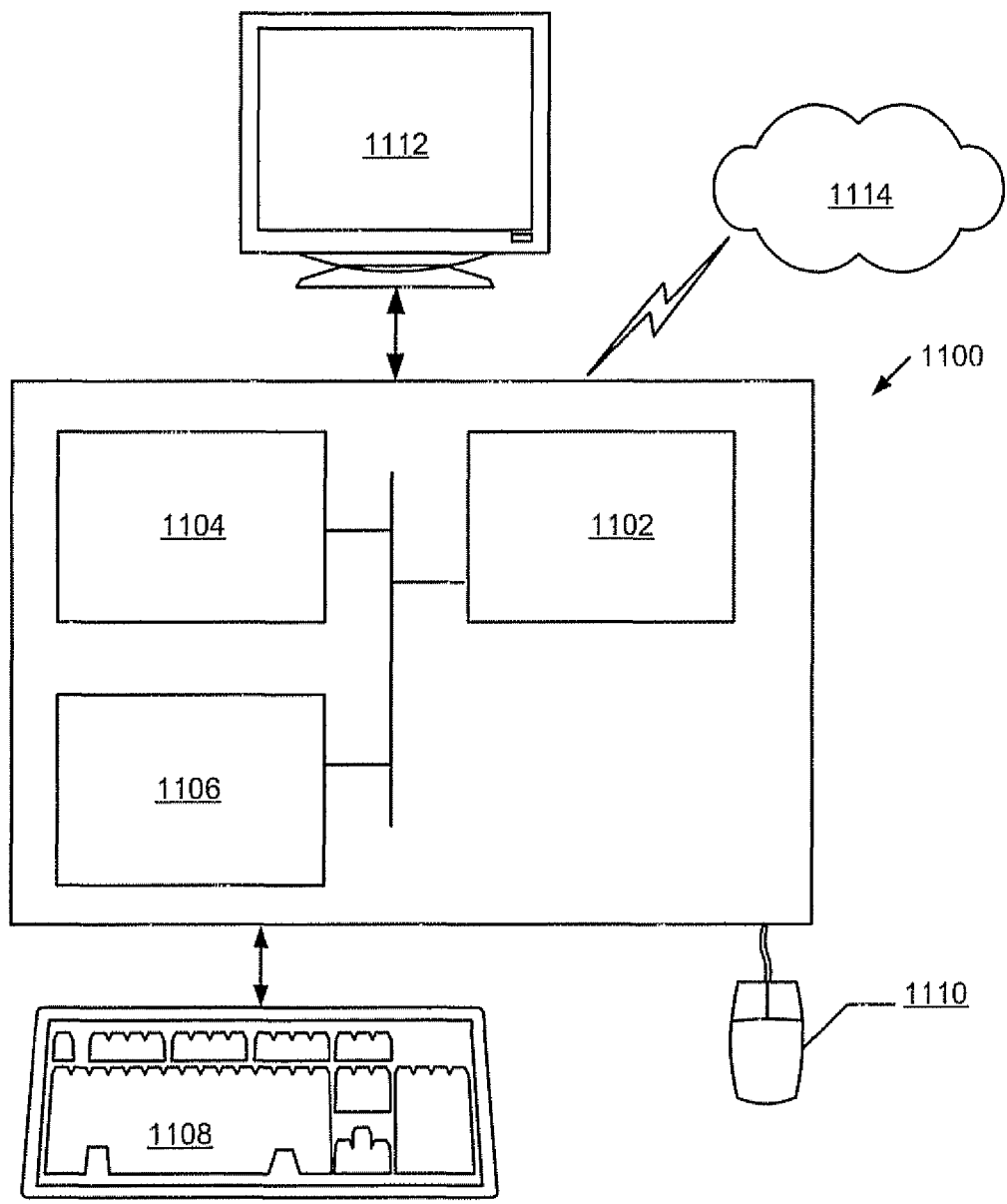
FIG. 11 shows a computer system in accordance with one or more embodiments of the invention.

FIG. 11:

Embodiments of the invention may be implemented on virtually any type of computer regardless of the platform being used. For example, as shown in FIG. 11, a computer system (1100) includes one or more processor(s) (1102), associated memory (1104) (e.g., random access memory (RAM), cache memory, flash memory, etc.), a storage device (1106) (e.g., a hard disk, an optical drive such as a compact disk drive or digital video disk (DVD) drive, a flash memory stick, etc.), and numerous other elements and functionalities typical of today's computers (not shown). The computer (1100) may also include input means, such as a keyboard (1108), and a mouse (1110). Further, the computer (400) may include output means, such as a monitor (412) (e.g., a liquid crystal display (LCD), a plasma display, a plotter, or cathode ray tube (CRT) monitor). The computer system (1100) may be connected to a network (1114) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (1100) includes at least the minimal processing, input, and/or output means necessary to practice embodiments of the invention.

Illustrative Embodiments:

In one embodiment, there is disclosed a method comprising operating equipment comprising a piston within a cylinder; obtaining parameters of the equipment from a data repository; calculating a P-V cycle as a function of a crankshaft rotation angle; calculating a rod load using the P-V cycle values. In some embodiments, the method also includes using correctional measures for keeping the rod load below pre-defined levels.

In one embodiment, there is disclosed a method comprising operating a compressor; obtaining operating parameters of the compressor; starting a counter for a crankshaft angle from 0 to 360 degrees; calculating piston displacement and a volume of gas in a cylinder of the compressor as a function of the angle; and calculating a pressure within the cylinder. In some embodiments, the method also includes determining if the cylinder pressure is greater than a suction line pressure. In some embodiment, the method also includes determining an angle at which a suction valve opened, and determining the suction valve pressure loss. In some embodiments, the method also includes calculating a power loss caused by the suction valve. In some embodiments, the method also includes determining if the cylinder pressure is greater than a discharge line pressure. In some embodiments, the method also includes determining a discharge valve pressure loss. In some embodiments, the method also includes calculating a power loss caused by the discharge valve. In some embodiments, the method also includes calculating actual and theoretical flow through the cylinder. In some embodiments, the method also includes calculating total power consumption of the cylinder. In some embodiments, the method also includes calculating a P-V diagram for the cylinder. In some embodiments, the method also includes calculating a temperature change across at least one valve of the cylinder.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

That which is claimed is:

1. A method comprising:
operating equipment comprising a piston within a cylinder;
obtain equipment parameters from the operating equipment;
reporting at least one operating parameter to a data repository;
obtaining parameters of the equipment from the data repository;
calculating a P-V cycle as a function of a crankshaft rotation angle;
calculating a rod load using the P-V cycle values;
determining if the cylinder pressure is greater than a suction line pressure
determining an angle at which a suction valve opened; and
determining the suction valve pressure loss.

2. The method of claim 1, further comprising using correctional measures for keeping the rod load below pre-defined levels.

3. A method comprising:
operating a compressor;
obtaining operating parameters of the compressor;
starting a counter for a crankshaft angle from 0 to 360 degrees;
calculating piston displacement and a volume of gas in a cylinder of the compressor as a function of the angle;
calculating a pressure within the cylinder;
determining if the cylinder pressure is greater than a suction line pressure;
determining an angle at which a suction valve opened; and
determining the suction valve pressure loss.

4. The method of claim 3, further comprising:
calculating a power loss caused by the suction valve.

5. The method of claim 3, further comprising:
determining if the cylinder pressure is greater than a discharge line pressure.

6. The method of claim 3, further comprising:
determining a discharge valve pressure loss.
7. The method of claim 3, further comprising:
calculating a power loss caused by the discharge valve.
8. The method of claim 3, further comprising:
calculating actual and theoretical flow through the cylinder.
9. The method of claim 3, further comprising:
calculating total power consumption of the cylinder.
10. The method of one claim 3, further comprising:
calculating a P-V diagram for the cylinder.
11. The method of claim 3, further comprising:
calculating a temperature change across at least one valve of the cylinder.

* * * * *